US012719708B2

(12) United States Patent
Liu et al.

(10) Patent No.: US 12,719,708 B2
(45) Date of Patent: Aug. 25, 2026

(54) DATA PROCESSING METHOD AND APPARATUS FOR BLOCKCHAIN, DEVICE, MEDIUM, AND PRODUCT

(71) Applicant: Tencent Technology (Shenzhen) Company Limited, Shenzhen (CN)

(72) Inventors: Hanqing Liu, Shenzhen (CN); Zongyou Wang, Shenzhen (CN); Gengliang Zhu, Shenzhen (CN); Yifang Shi, Shenzhen (CN); Qucheng Liu, Shenzhen (CN); Zhiyong Liao, Shenzhen (CN); Kaixuan Nie, Shenzhen (CN); Yangjun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

(21) Appl. No.: 19/054,203

(22) Filed: Feb. 14, 2025

(65) Prior Publication Data

US 2025/0226997 A1 Jul. 10, 2025

Related U.S. Application Data

(63) Continuation of application No. PCT/CN2023/131457, filed on Nov. 14, 2023.

(30) Foreign Application Priority Data

Feb. 1, 2023 (CN) ........................ 202310145618.6

(51) Int. Cl.
*H04L 9/00* (2022.01)
*H04L 9/32* (2006.01)

(52) U.S. Cl.
CPC .............. *H04L 9/50* (2022.05); *H04L 9/3236* (2013.01); *H04L 9/3247* (2013.01)

(58) Field of Classification Search
CPC ....... H04L 9/50; H04L 9/3239; H04L 9/3236; H04L 9/3247; H04L 9/32; H04L 9/40
(Continued)

(56) References Cited

U.S. PATENT DOCUMENTS 11,921,479 B2 * 3/2024 Valin ....................... H02S 10/10
11,928,233 B2 * 3/2024 Mi ........................ H04L 9/0825
(Continued)

FOREIGN PATENT DOCUMENTS

CN 109635585 A 4/2019
CN 111428207 A 7/2020
(Continued)

OTHER PUBLICATIONS

International Search Report and Written Opinion with English translations, Jan. 25, 2024, pp. 1-13, issued in International Application No. PCT/CN2023/131457, China National Intellectual Property Administration, Beijing, China.

*Primary Examiner* — Amare F Tabor
(74) *Attorney, Agent, or Firm* — Crowell & Moring LLP

(57) ABSTRACT

Embodiments of this disclosure disclose a data processing method and apparatus for a blockchain, a device, a medium, and a product, which are applicable to the field of blockchain technologies. The method includes: packaging a first object operation transaction submitted by a first service object and a second object operation transaction submitted by a second service object in a to-be-assembled transaction pool to obtain an initial on-chain transaction, both the second service object and the first service object being off-chain registered objects; performing on-chain signing processing on the initial on-chain transaction by using private key
(Continued)

information of a service providing object, and constructing a target on-chain transaction based on on-chain transaction signature information and transaction parameters in the initial on-chain transaction; and transmitting, when the service providing object is an on-chain registered object, the target on-chain transaction to a consensus node associated with a blockchain. According to the embodiments of this disclosure, occupation of storage space of the blockchain by a registration transaction of a service object can be reduced, and security of a key of the off-chain registered object can be improved.

18 Claims, 9 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 12,323,540 | B2 * | 6/2025 | Kaplan | H04L 9/50 |
| 12,517,892 | B2 * | 1/2026 | Simpson | G01C 21/3407 |
| 2019/0123895 | A1 | 4/2019 | Blake et al. | |
| 2024/0243934 | A1 * | 7/2024 | Moreau | G06Q 20/363 |

FOREIGN PATENT DOCUMENTS

| | | | |
|---|---|---|---|
| CN | 111552991 | A | 8/2020 |
| CN | 113421092 | A | 9/2021 |
| CN | 113421097 | A | 9/2021 |

* cited by examiner

DATA PROCESSING METHOD AND APPARATUS FOR BLOCKCHAIN, DEVICE, MEDIUM, AND PRODUCT

RELATED APPLICATION

This application is based on and claims the benefit of priority to PCT Application No. PCT/CN2023/131457, filed on Nov. 14, 2023, which claims priority to Chinese Patent Application No. 2023101456186, entitled "DATA PROCESSING METHOD AND APPARATUS FOR BLOCKCHAIN, DEVICE, MEDIUM, AND PRODUCT" filed with the China National Intellectual Property Administration on Feb. 1, 2023, which are incorporated herein by reference in their entireties.

FIELD OF THE TECHNOLOGY

This application relates to the field of blockchain technologies, and in particular, to a data processing method and apparatus for a blockchain, a device, a medium, and a product.

BACKGROUND OF THE DISCLOSURE

Currently, before enabling transaction data to be on-chain by using a blockchain, a service object needs to perform address registration on the blockchain, that is, an address corresponding to a private key of the service object needs to be registered and written into the blockchain. In this way, after address registration succeeds, the service object may perform, by using the private key corresponding to the address registered on the blockchain, transaction signing on the transaction data that needs to be on-chain, and then may transmit the transaction data obtained after the transaction signing to a consensus node corresponding to the blockchain, so that the consensus node enables the transaction data to be on-chain.

However, in practice, when a service object uses a blockchain to perform address registration, the service object needs to perform address registration by using one to two on-chain transactions reflected during registration. In this way, after obtaining the one to two on-chain transactions (that is, one to two registration transactions generated during address registration), a consensus node on the blockchain may write an address corresponding to a private key of the service object into the blockchain by executing the one to two on-chain transactions, and then the one to two on-chain transactions generated during address registration may be written into the blockchain. Clearly, for a large quantity of service objects that need to perform address registration, when each service object performs address registration, undifferentiated on-chain processing is performed on the one to two on-chain transactions reflected during registration by each service object, so that for the consensus node on the blockchain, large storage overheads are consumed for the on-chain transactions, that is, a large quantity of on-chain transactions generated on the blockchain occupy large storage space of the consensus node of the blockchain, which increases storage pressure of the consensus node of the blockchain. In addition, when the service objects need to register and write addresses corresponding to private keys of the service objects into the blockchain, once keys corresponding to the addresses registered on the blockchain (for example, the private keys of the service objects) are at risk of key leakage, on-chain permissions of the addresses corresponding to the keys of the service objects will be read by unauthorized objects without authorization. Consequently, there is a risk that the on-chain permissions of the addresses corresponding to the keys of the service objects are read on the blockchain without authorization.

SUMMARY

Embodiments of this disclosure provide a data processing method and apparatus for a blockchain, a device, a medium, and a product. Object registration may be performed on a service object on a service node without registering and writing an address submitted by the service object into a blockchain. In this way, storage pressure of a consensus node on the blockchain may be reduced, and an address of the service object may be prevented from being read on the blockchain, thereby avoiding a risk that due to leakage of a key of the service object, an on-chain permission of an address corresponding to the key is read on the blockchain without authorization.

According to an aspect of the embodiments of this disclosure, a data processing method for a blockchain is provided. The method is performed by a service node, and the method includes:

adding, when a first object operation transaction associated with a first service object is received, the first object operation transaction to a local transaction pool of the service node, and using the local transaction pool added with the first object operation transaction as a to-be-assembled transaction pool; transactions in the to-be-assembled transaction pool including the first object operation transaction and a second object operation transaction; the first object operation transaction being operation data submitted by the first service object; the second object operation transaction being operation data submitted by a second service object; both the second service object and the first service object being off-chain registered objects in the service node; the off-chain registered object being a service object that performs object registration on the service node and is successfully registered; the object registration referring to a registration operation performed, on the service node, for an object identifier and an address submitted by the service object; and the service object including the first service object and the second service object; and performing, when the to-be-assembled transaction pool satisfies an operation transaction packaging condition of the service node, transaction packaging on the first object operation transaction and the second object operation transaction, to obtain an initial on-chain transaction; the transaction packaging referring to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction being a to-be-signed on-chain transaction obtained after the service node performs the packaging operation; and the to-be-signed on-chain transaction referring to a transaction when the initial on-chain transaction is to be signed by a service providing object;

performing signing processing, when private key information of a service providing object corresponding to the service node is obtained, on the initial on-chain transaction by using the private key information of the service providing object, to obtain on-chain transaction signature information of the service providing object for the initial on-chain transaction, and constructing a target on-chain transaction corresponding to the initial on-chain transaction based on the on-chain transaction signature information, public key information of the service providing object, and the transaction parameters in the initial on-chain transaction; the target on-chain transaction being a signed on-chain transaction; the signed on-chain transaction referring to a transaction obtained after the initial on-chain transaction is signed by the service providing object, and transaction parameters in the target on-chain transaction including the on-chain transaction signature information, the public key information of the service providing object, and the transaction parameters in the initial on-chain transaction; the signing processing being a signing operation performed by the service node when encrypting a hash value of the initial on-chain transaction by using the private key information of the service providing object, and the on-chain transaction signature information being a digital signature obtained by the service node after performing the signing operation; and the hash value of the initial on-chain transaction being determined by the transaction parameters in the initial on-chain transaction; and transmitting, when the service providing object is an on-chain registered object obtained after address registration is performed on a blockchain, the target on-chain transaction to a consensus node associated with the blockchain, so that the consensus node performs, when obtaining the on-chain transaction signature information through parsing, signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the first object operation transaction and the second object operation transaction; the address registration referring to a registration operation performed, on the consensus node, for the address submitted by the service providing object.

According to an aspect of the embodiments of this disclosure, a data processing method for a blockchain is provided. The method is performed by a consensus node associated with a blockchain, and the method includes:

receiving a target on-chain transaction transmitted by a service node; a service providing object corresponding to the service node being an on-chain registered object obtained after address registration is performed on the blockchain; the address registration referring to a registration operation performed, on the consensus node, for an address submitted by the service providing object; the target on-chain transaction being a signed on-chain transaction; the signed on-chain transaction being a transaction obtained after an initial on-chain transaction is signed by the service providing object; transaction parameters in the target on-chain transaction including on-chain transaction signature information, public key information of the service providing object, and transaction parameters in the initial on-chain transaction, the on-chain transaction signature information being obtained by the service node by performing signing processing on the initial on-chain transaction by using private key information of the service providing object, and the initial on-chain transaction being obtained by the service node after performing transaction packaging on a first object operation transaction and a second object operation transaction; the transaction packaging referring to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction being a to-be-signed on-chain transaction obtained after the service node performs the packaging operation; and the to-be-signed on-chain transaction referring to a transaction when the initial on-chain transaction is to be signed by a service providing object; the first object operation transaction being operation data submitted by a first service object, the second object operation transaction being operation data submitted by a second service object, and both the second service object and the first service object being off-chain registered objects obtained after object registration is performed on the service node; the off-chain registered object being a service object that performs object registration on the service node and is successfully registered; the object registration referring to a registration operation performed, on the service node, for an object identifier and an address submitted by the service object; and the service object including the first service object and the second service object; and performing parameter parsing on the transaction parameters in the target on-chain transaction, and when the on-chain transaction signature information is obtained through parsing, performing signature verification on the on-chain transaction signature information by using the public key information of the service providing object carried in the target on-chain transaction, and when the signature verification is successful, invoking entry processing data deployed on the blockchain to perform parameter parsing on the transaction parameters in the initial on-chain transaction, to obtain the first object operation transaction corresponding to the first service object and the second object operation transaction corresponding to the second service object.

According to an aspect of the embodiments of this disclosure, a data processing apparatus for a blockchain is provided. The apparatus runs on a service node, and the apparatus includes:

a transaction receiving module, configured to: add, when a first object operation transaction associated with a first service object is received, the first object operation transaction to a local transaction pool of the service node, and use the local transaction pool added with the first object operation transaction as a to-be-assembled transaction pool; transactions in the to-be-assembled transaction pool including the first object operation transaction and a second object operation transaction; the first object operation transaction being operation data submitted by the first service object; the second object operation transaction being operation data submitted by a second service object; both the second service object and the first service object being off-chain registered objects; the off-chain registered object being a service object that performs object registration on the service node and is successfully registered; the object registration referring to a registration operation performed, on the service node, for an object identifier and an address submitted by the service object; and the service object including the first service object and the second service object; and a transaction determining module, configured to perform, when the to-be-assembled transaction pool satisfies an operation transaction packaging condition of the service node, transaction packaging on the first object operation transaction and the second object operation transaction, to obtain an initial on-chain transaction; the transaction packaging referring to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction being a to-be-signed on-chain transaction obtained after the service node performs the packaging operation; and the to-be-signed on-chain transaction referring to a transaction when the initial on-chain transaction is to be signed by a service providing object;

the transaction determining module being further configured to: perform signing processing, when private key information of a service providing object corresponding to the service node is obtained, on the initial on-chain transaction by using the private key information of the service providing object, to obtain on-chain transaction signature information of the service providing object for the initial on-chain transaction, and construct a target on-chain transaction corresponding to the initial on-chain transaction based on the on-chain transaction signature information, public key information of the service providing object, and the transaction parameters in the initial on-chain transaction; the target on-chain transaction being a signed on-chain transaction; the signed on-chain transaction referring to a transaction obtained after the initial on-chain transaction is signed by the service providing object, and transaction parameters in the target on-chain transaction including the on-chain transaction signature information, the public key information of the service providing object, and the transaction parameters in the initial on-chain transaction; the signing processing being a signing operation performed by the service node when encrypting a hash value of the initial on-chain transaction by using the private key information of the service providing object, and the on-chain transaction signature information being a digital signature obtained by the service node after performing the signing operation; and the hash value of the initial on-chain transaction being determined by the transaction parameters in the initial on-chain transaction; and a transmitting module, configured to transmit, when the service providing object is an on-chain registered object obtained after address registration is performed on a blockchain, the target on-chain transaction to a consensus node associated with the blockchain, so that the consensus node performs, when obtaining the on-chain transaction signature information through parsing, signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the first object operation transaction corresponding to the first service object and the second object operation transaction corresponding to the second service object; the address registration referring to a registration operation performed, on the consensus node, for the address submitted by the service providing object.

According to an aspect of the embodiments of this disclosure, a data processing apparatus for a blockchain is provided. The apparatus runs on a consensus node associated with a blockchain, and the apparatus includes:

a transaction receiving module, configured to receive a target on-chain transaction transmitted by a service node; a service providing object corresponding to the service node being an on-chain registered object obtained after address registration is performed on the blockchain; the address registration referring to a registration operation performed, on the consensus node, for an address submitted by the service providing object; the target on-chain transaction being a signed on-chain transaction; the signed on-chain transaction being a transaction obtained after an initial on-chain transaction is signed by the service providing object; transaction parameters in the target on-chain transaction including on-chain transaction signature information, public key information of the service providing object, and transaction parameters in the initial on-chain transaction, the on-chain transaction signature information being obtained by the service node by performing signing processing on the initial on-chain transaction by using private key information of the service providing object, and the initial on-chain transaction being obtained by the service node after performing transaction packaging on a first object operation transaction and a second object operation transaction; the transaction packaging referring to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction being a to-be-signed on-chain transaction obtained after the service node performs the packaging operation; and the to-be-signed on-chain transaction referring to a transaction when the initial on-chain transaction is to be signed by a service providing object; the first object operation transaction being operation data submitted by a first service object, the second object operation transaction being operation data submitted by a second service object, and both the second service object and the first service object being off-chain registered objects; the off-chain registered object being a service object that performs object registration on the service node and is successfully registered; the object registration referring to a registration operation performed, on the service node, for an object identifier and an address submitted by the service object; and the service object including the first service object and the second service object; and a transaction processing module, configured to perform parameter parsing on the transaction parameters in the target on-chain transaction, and when the on-chain transaction signature information is obtained through parsing, perform signature verification on the on-chain transaction signature information by using the public key information of the service providing object, and when the signature verification is successful, invoke entry processing data deployed on the blockchain to perform parameter parsing on the transaction parameters in the initial on-chain transaction, to obtain the first object operation transaction corresponding to the first service object and the second object operation transaction corresponding to the second service object.

An aspect of the embodiments of this disclosure provides a computer device, including: a processor and a memory, the memory being connected to the processor, the memory being configured to store a computer program, and the processor being configured to invoke the computer program, so that the computer device performs the method provided in the embodiment of this disclosure.

An aspect of the embodiments of this disclosure provides a computer readable storage medium. The computer readable storage medium stores a computer program. The computer program is adapted to be loaded and executed by a processor, so that a computer device having the processor performs the method provided in the embodiment of this disclosure.

An aspect of the embodiments of this disclosure provides a computer program product or a computer program. The computer program product or the computer program includes computer instructions, and the computer instructions are stored in a computer readable storage medium. A processor of a computer device reads the computer instructions from the computer-readable storage medium, and the processor executes the computer instructions, so that the computer device performs the method provided in the embodiment of this disclosure.

In the embodiments of this disclosure, when a service object (for example, a first service object) needs to submit an object operation transaction (for example, a first object operation transaction) to a service node, the service object (for example, the first service object) does not need to perform address registration on a blockchain (which may be specifically a consensus node in a consensus network in which the blockchain is located), but performs object registration on the service node in the blockchain. In this way, when receiving the first object operation transaction submitted by the first service object, the service node in the blockchain may add the first object operation transaction to a local transaction pool in which a second object operation transaction is stored. Further, the local transaction pool to which the first object operation transaction is newly added may be used as a to-be-assembled transaction pool. In the embodiments of this disclosure, operation time information of the second object operation transaction is earlier than operation time information of the first object operation transaction. In this way, when using the local transaction pool to which the first object operation transaction is newly added as the to-be-assembled transaction pool, the service node may further determine whether the to-be-assembled transaction pool satisfies an operation transaction packaging condition; and if the operation transaction packaging condition is satisfied, may perform transaction packaging on the first object operation transaction and the second object operation transaction in the to-be-assembled transaction pool, to call a to-be-signed transaction obtained through packaging as an initial on-chain transaction. Herein, the transaction packaging refers to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction is a to-be-signed on-chain transaction obtained after the service node performs the packaging operation; and the to-be-signed on-chain transaction refers to a transaction when the initial on-chain transaction is to be signed by a service providing object. In other words, in this case, the transaction parameters in the initial on-chain transaction are specifically embodied as the first object operation transaction and the second object operation transaction. The first service object and the second service object herein may be the same service object or different service objects. For ease of understanding, an example in which the first service object and the second service object are different service objects is used. In this way, the service node may package object operation transactions respectively submitted by a plurality of service objects into one initial on-chain transaction. Then, when obtaining a private key of a service providing object (that is, private key information of the service providing object), the service node may perform signing processing on the initial on-chain transaction by using the private key of the service providing object (that is, the private key information of the service providing object). Then, on-chain transaction signature information of the service providing object for the initial on-chain transaction may be obtained. That the signing processing herein is a signing operation performed by the service node when encrypting a hash value of the initial on-chain transaction by using the private key information of the service providing object, and the on-chain transaction signature information is a digital signature obtained by the service node after performing the signing operation; and the hash value of the initial on-chain transaction is determined by the transaction parameters in the initial on-chain transaction. Further, the service node may attach the on-chain transaction signature information and public key information of the service providing object to the initial on-chain transaction, so that when the transaction parameters in the initial on-chain transaction, the on-chain transaction signature information, and the public key information of the service providing object are used together as transaction parameters of a target on-chain transaction, the target on-chain transaction may be constructed based on the transaction parameters of the target on-chain transaction, and then the target on-chain transaction packaged with a plurality of object operation transactions may be uploaded to a consensus node associated with the blockchain (that is, the consensus node on the blockchain). In this way, when obtaining the on-chain transaction signature information through parsing, the consensus node may further perform signature verification on the on-chain transaction signature information by using the public key information of the service providing object, and then when the signature verification is successful, invoke entry processing data (that is, an entry contract) to perform parameter parsing on the transaction parameters in the initial on-chain transaction, to obtain the first object operation transaction and the second object operation transaction that can be executed on the consensus node side. Because the service object does not need to perform address registration on the blockchain, and only the service providing object needs to perform address registration on the blockchain, a quantity of registration transactions generated during address registration on the blockchain can be reduced from a root source, thereby effectively alleviating storage pressure of the consensus node on the blockchain, and avoiding a possibility that the on-chain permission of the address corresponding to the private key of the service object is read without authorization due to leakage of the private key of the service object. In addition, when the service node uploads the target on-chain transaction (that is, the signed transaction) obtained through packaging to the consensus node on the blockchain, the service node is equivalent to uploading a plurality of object operation transactions in the target on-chain transaction in batches to the consensus node on the blockchain, thereby improving transaction uploading efficiency.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

The technical solutions in embodiments of this disclosure are described in the following with reference to the accompanying drawings in the embodiments of this disclosure. The described embodiments are examples embodiments of this disclosure. All other embodiments obtained by a person of ordinary skill in the art based on the embodiments of this disclosure without making creative efforts shall fall within the protection scope of this disclosure.

Figure 1:
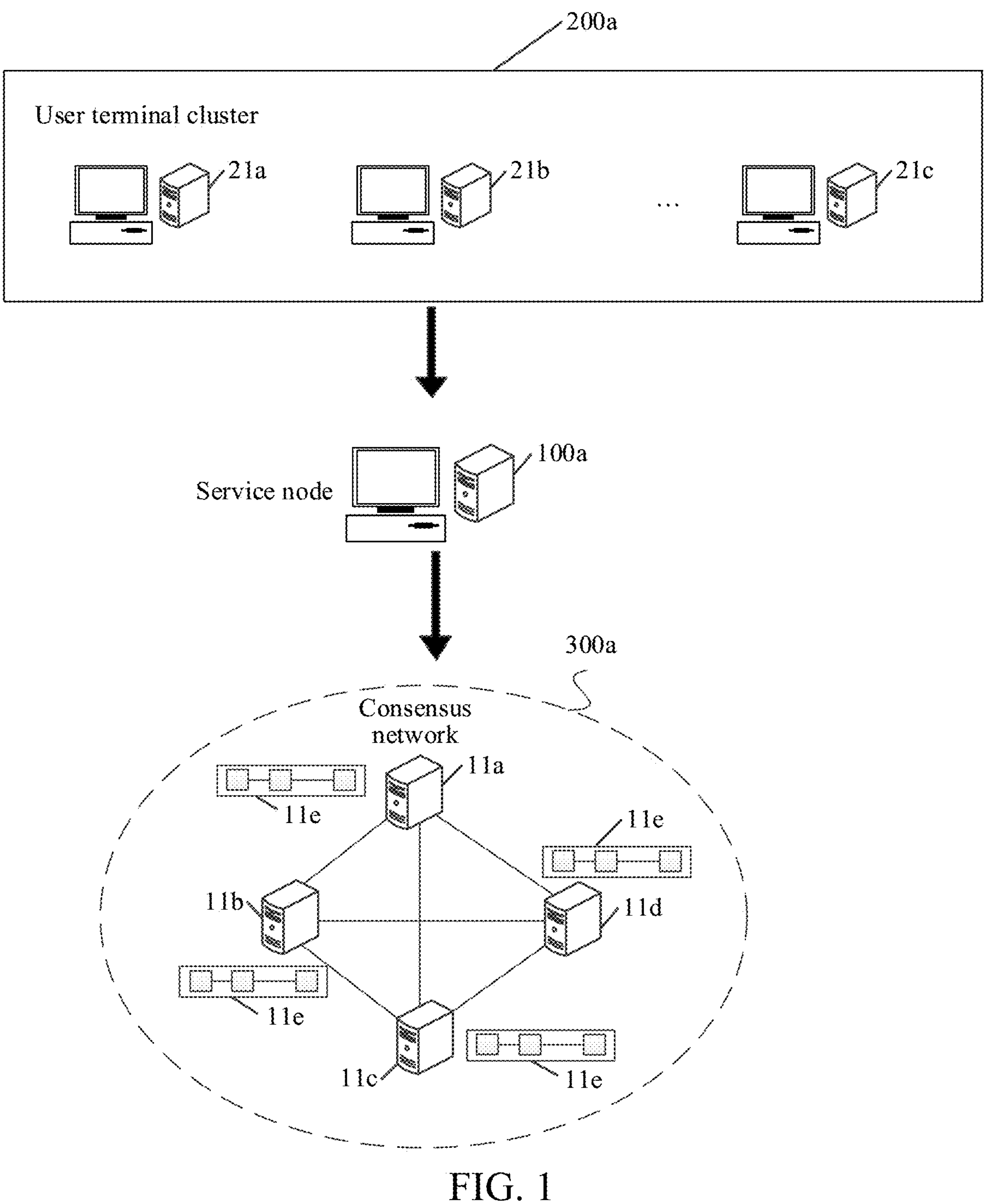
FIG. 1 is an example schematic structural diagram of a blockchain-based data processing system according to an embodiment of this disclosure.

Referring to FIG. 1, FIG. 1 is a schematic structural diagram of a blockchain-based data processing system according to an embodiment of this disclosure. The data processing system shown in FIG. 1 may include a service node 100*a* of a service providing object, a user terminal cluster 200*a* corresponding to a service object associated with the service providing object, and a consensus network 300*a*. The user terminal cluster 200*a* shown in FIG. 1 may specifically include a user terminal 21*a*, a user terminal 21*b*, . . . , and a user terminal 21*c*. The user terminal 21*a*, the user terminal 21*b*, . . . , and the user terminal 21*c* may perform data exchange with the service node 100*a* shown in FIG. 1. For ease of understanding, an example in which the data processing system shown in FIG. 1 is a data processing system configured to sign an electronic contract is used herein. In this case, the service providing object corresponding to the service node 100*a* in the data processing system may be a provider configured to provide an electronic contract signing platform, also referred to as a service party. In addition, the service object associated with the service providing object may be a user using the electronic contract signing platform (that is, a customer using a service provided by the service providing object, also referred to as a c-end user). The service object may sign an electronic contract on the electronic contract signing platform by using a user terminal. In this way, the service node corresponding to the service providing object may upload the electronic contract signed by the service object to the blockchain through the electronic contract signing platform, to perform data evidence storage on the blockchain.

A plurality of consensus nodes are deployed in the consensus network 300*a* shown in FIG. 1. The plurality of consensus nodes herein may specifically include a consensus node 11*a*, a consensus node 11*b*, a consensus node 11*c*, and a consensus node 11*d* shown in FIG. 1. A quantity of consensus nodes deployed in the consensus network 300*a* is not limited herein. In addition, as shown in FIG. 1, for the plurality of consensus nodes running in the consensus network 300*a*, the blockchain that is jointly maintained thereby is specifically a blockchain 11*e* shown in FIG. 1.

The blockchain involved in the embodiments of this disclosure is a new disclosure mode of a computer technology such as distributed data storage, point-to-point transmission, a consensus mechanism, or an encryption algorithm. It is mainly configured for sorting data in chronological order and encrypting the data into a ledger, so that the data cannot be tampered with or forged, and the data can be verified, stored, and updated. The blockchain is essentially a decentralized database, and each consensus node in the database stores the same blockchain.

For example, the blockchain stored in each consensus node in the consensus network 300*a* is the blockchain 11*e*. For ease of understanding, a selected consensus node among the consensus nodes in the consensus network may be used as a target consensus node by using a consensus mechanism in the consensus network.

In this embodiment of this disclosure, the blockchain 11*e* may be a blockchain with an access permission mechanism. For example, the blockchain 11*e* may be a consortium blockchain. For the blockchain 11*e*, only an object (for example, the foregoing service providing object) that obtains an access permission can transmit a transaction to the blockchain. That is, only after an object (for example, the foregoing service providing object) performs address registration on the blockchain, can transaction signing be further performed, by using a private key (that is, private key information) corresponding to a registered address, on a transaction that aggregates operation data (which may also be referred to as user operation data) of a massive quantity of c-end users, and then the transaction after the transaction signing may be transmitted to a consensus node (for example, the foregoing consensus node) on the blockchain.

The transaction transmitted to the consensus node on the blockchain may include at least the following key fields: User operation (UO) data submitted by the c-end user (that is, a service object that does not need to perform address registration on the blockchain), a transaction sender (for example, an address of the service providing object after performing address registration on the blockchain), a public key of the transaction sender (that is, a public key corresponding to the address of the service providing object), digital signature information of the transaction sender (that is, signature information obtained after the transaction is signed by using a private key corresponding to the address of the service providing object), a transaction time stamp, a transaction hash, a transaction fee, other transaction data (a smart contract invoked by the transaction, and a parameters passed in when the transaction invokes the smart contract), and the like. This is not limited herein.

In this embodiment of this disclosure, because the service object does not need to perform address registration on the blockchain, but may use a registration request (for example, a user registration request) transmitted by the user terminal to the service node to implement object registration of the service object on the service node by using a registration service component corresponding to a registration service deployed on the service node. That is, the service node may, when obtaining the registration request (for example, the user registration request) transmitted by the user terminal, obtain an object identifier of the service object and an address of the service object carried in the registration request (for example, the user registration request). Then, a mapping relationship between the object identifier of the service object and the address of the service object may be established, and then the address of the service object and the object identifier that has the mapping relationship with the address of the service object may be stored in object registration service information (for example, a user list) maintained by the service node, to implement object registration of the service object locally at the service node (that is, on the service node). In this embodiment of this disclosure, a service object that performs object registration on the service node and is successfully registered may be referred to as an off-chain registered object. For ease of distinction, in this embodiment of this disclosure, a registration operation performed on the service node may be referred to as performing object registration for the service object, and a registration operation performed on the consensus node of the blockchain may be referred to as performing address registration for the address of the service providing object. In other words, in this embodiment of this disclosure, the object registration herein aims to write the object identifier of the service object and the address that has the mapping relationship with the object identifier of the service object into the user list maintained by the service node. The user list maintained by the service node may be collectively referred to as object address registration information in this embodiment of this disclosure. The address registration herein is to write the address of the service providing object into the blockchain. In other words, in this embodiment of this disclosure, only the address of the registration service object needs to be registered and written into the blockchain, but the address of the service object does not need to be registered and written into the blockchain.

The user terminals in the user terminal cluster may be nodes in a service network of a blockchain network, or may be nodes in another subnetwork associated with the service network, or may be nodes associated with service nodes in the service network in the blockchain network, which is not limited herein. The service node corresponding to the service providing objects may belong to the nodes in the service network in the blockchain network.

Before using the blockchain to perform transaction on-chaining, the service providing object needs to register the address corresponding to the private key thereof on the blockchain. When the service providing object performs address registration on the blockchain, each registration behavior is reflected as one to two registration transactions. A transaction parameter of a transaction used by the service providing object to perform registration (also referred to as a registration transaction) includes the address of the service providing object, and the registration transaction may be signed by using a key of a blockchain management object. After the address of the service providing object is registered on the blockchain, the service providing object may sign, by using the private key thereof, a transaction that needs to be on-chain, and transmit the signed transaction to the blockchain. In most cases, an object registration process is necessary and feasible.

The service providing object may alternatively be independently deployed in the blockchain to provide a registration service component to the service object. For example, in this embodiment of this disclosure, a registration operation is performed by the registration service component deployed on the service node, to implement object registration on the service node. Specifically, registration of the address of the service object may be further implemented through object registration locally at the service node. In other words, if a service object needs to use the service provided by the service providing object, object registration needs to be performed based on the registration service corresponding to the service providing object. The service object can use the service provided by the service providing object after performing object registration based on the registration service provided by the service providing object. In other words, in this case, for the service object that performs object registration on the service node and is successfully registered, the service object that performs object registration on the service node and is successfully registered may be referred to as a service object obtained after object registration, or the off-chain registered object. In this case, the service node may further add, to the transaction pool of the service node, a transaction (for example, user operation data, that is, the foregoing UO) transmitted by the service object obtained after object registration. One piece of user operation data (also referred to as one piece of operation data) herein is one object operation transaction. In this way, the service node may subsequently perform transaction packaging on a plurality of transactions (a plurality of pieces of user operation data) submitted by one service object in the transaction pool, or the service node may perform transaction packaging on a plurality of transactions (a plurality of pieces of user operation data) submitted by a plurality of service objects in the transaction pool, to package a plurality of transactions (object operation transactions) submitted by one or more service objects into one on-chain transaction, and then the service node may transmit the on-chain transaction obtained through packaging to the consensus node on the blockchain. For any transaction packaging manner, the transaction packaging refers to a packaging operation performed by the service node after performing transaction sorting on the first object operation transaction and the second object operation transaction and when using the sorted first object operation transaction and second object operation transaction as the transaction parameters of the initial on-chain transaction. For example, the service providing object is a provider of an electronic contract signing platform, a service object that performs object registration based on a registration service deployed by the service providing object and is successfully registered (also referred to as a registered service object, an off-chain registered object, or the like) may sign an electronic contract. The registered service object may initiate a transaction for on-chaining a registered electronic contract for evidence storage. When the service node detects that transactions submitted by one or more registered service objects satisfy a specific condition, for example, a transaction quantity of transactions submitted by the registered service object reaches a specific threshold, transaction packaging may be performed on the transactions that satisfy the specific condition, to obtain one transaction (that is, the foregoing on-chain transaction). Then, the service node may perform transaction signing on the currently packaged transaction (that is, the foregoing on-chain transaction) by using the private key corresponding to the address of the service providing object, to obtain signature information of the service providing object, and then may transmit the signed transaction to the consensus node on the blockchain. Compared with a manner in which after the service object signs the transaction by using a key of the service object (that is, by using the private key of the service object), the service node corresponding to the service providing object separately forwards the signed transaction of the service object to the consensus node on the blockchain, in a manner in which the service node packages a plurality of transactions submitted by a service object or a plurality of transactions submitted by a plurality of service objects, to obtain one on-chain transaction, and then the service node may transmit a signed on-chain transaction to the consensus node on the blockchain after signing the on-chain transaction by using the key of the service providing object (that is, the private key of the service providing object), a plurality of transactions submitted by a plurality of service objects or a plurality of transactions submitted by one service object may be transmitted to the consensus node on the blockchain at a time by using the on-chain transaction, so that transaction on-chaining can be more efficiently performed without address registration of the service objects on the blockchain, and a waste of storage space of the blockchain can be reduced.

In this disclosure, only the service providing object is required to perform address registration on the blockchain, and each service object under the service providing object is not required to perform address registration on the blockchain, so that occupation of storage space of the blockchain by registration transactions generated when the service objects perform address registration can be reduced. In addition, generally, the key of the service object may be hosted on the service providing object or holden by an individual. If the service object directly performs address registration on the blockchain, once keys corresponding to addresses registered on the blockchain are leaked, an attacker may directly transmit an unauthorized transaction to the consensus node on the blockchain by using the key obtained without authorization and corresponding to the address registered on the blockchain without performing address registration on the blockchain and without performing transaction forwarding through the service providing object, thereby increasing a risk of reading on-chain permissions of addresses corresponding to keys of massive service objects on the blockchain without authorization. Therefore, to avoid the risk that the on-chain permissions of the addresses corresponding to the keys of the massive service objects are read on the blockchain without authorization caused by key leakage of the massive service objects, the embodiments of this disclosure provide the following: The service object does not need to perform address registration on the blockchain, but the service providing object performs a registration operation on the registration service independently deployed on the service node in the blockchain, to implement object registration of the massive service objects on the service node. In this way, addresses registered on the blockchain can be reduced to some extent, and the risk that the key corresponding to the address registered on the chain is used without authorization can also be reduced, thereby improving use security of the key of the off-chain registered object. The off-chain registered object herein is a service object performing object registration on the service node.

Figure 2:
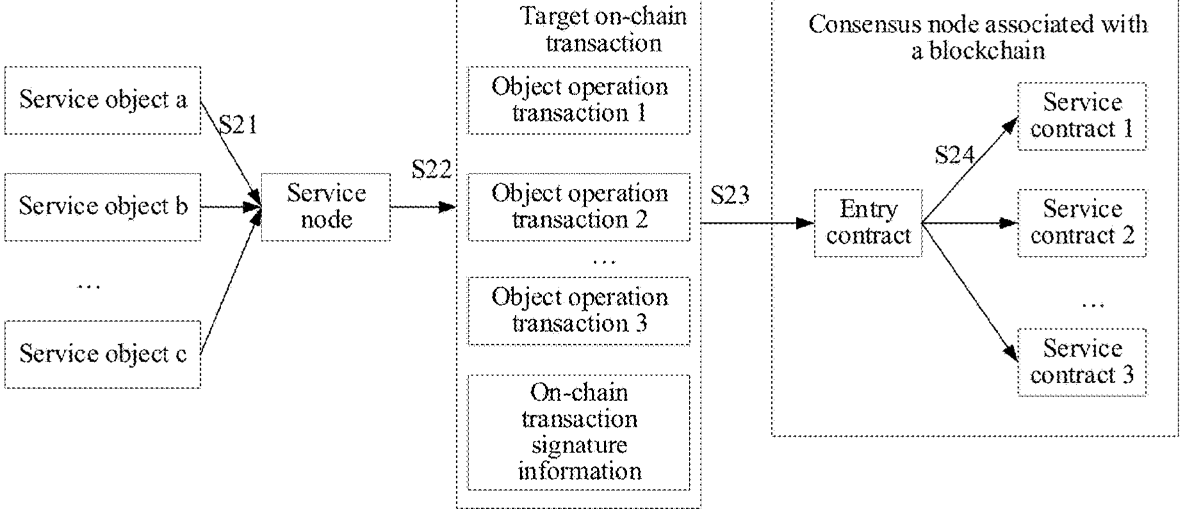
FIG. 2 is a schematic flowchart of transaction on-chaining according to an embodiment of this disclosure.

Based on the foregoing description, for a process of on-chaining a transaction submitted by a service object, refer to FIG. 2. FIG. 2 is a schematic flowchart of transaction on-chaining according to an embodiment of this disclosure. As shown in FIG. 2, service objects such as a service object a, a service object b, and a service object c may perform operation S21, to submit object operation transactions to the service node corresponding to the service providing object, and then the service node may verify whether the service objects are off-chain registered objects. If the service object is an off-chain registered object, the object operation transaction submitted by the service object may be added to an operation transaction pool of the service node. In this way, when determining that a transaction quantity of object operation transactions added to the operation transaction pool satisfies a specific condition, the service node may package a plurality of object operation transactions whose transaction quantity satisfies the specific condition into one transaction (that is, an on-chain transaction). For ease of understanding, in this embodiment of this disclosure, an on-chain transaction obtained after transaction packaging is performed on a plurality of object operation transactions may be referred to as an initial on-chain transaction. The initial on-chain transaction herein is a to-be-signed transaction. Each object operation transaction in the initial on-chain transaction may be represented as a transaction parameter of the initial on-chain transaction. To be specific, as shown in FIG. 2, in the process of performing operation S22, the service node may further perform signing processing (that is, transaction signing) on the initial on-chain transaction by using the private key of the service providing object, to obtain on-chain transaction signature information of the service providing object. After the on-chain transaction signature information is written into the initial on-chain transaction, a target on-chain transaction may be constructed based on the initial on-chain transaction carrying the on-chain transaction signature information. The target on-chain transaction herein is a signed transaction. As shown in FIG. 2, the constructed target on-chain transaction may include object operation transactions such as an object operation transaction 1, an object operation transaction 2, and an object operation suggestion 3, and may further include the on-chain transaction signature information. The on-chain transaction signature information herein refers to signature information obtained after transaction signing is performed on the initial on-chain transaction by using the private key of the service providing object (that is, the private key information of the service object). Then, the service node may perform operation S23, to transmit the target on-chain transaction to the consensus node of the blockchain. The consensus node shown in FIG. 2 may perform signature verification on the on-chain transaction signature information in the target on-chain transaction, and when the signature verification is successful, further invoke entry processing data shown in FIG. 2 to parse transaction parameters in the target on-chain transaction, to obtain each object operation transaction in the target on-chain transaction, and may invoke the entry processing data to obtain processing data invoking parameter information corresponding to each object operation transaction through parsing. Further, as shown in FIG. 2, the consensus node may further perform operation S24, to invoke service processing data indicated by corresponding processing data invoking parameter information to execute a corresponding object operation transaction.

For the consensus network of the blockchain, a specific process of writing the target on-chain transaction into a blockchain ledger may be as follows: The service node corresponding to the service providing object may transmit the target on-chain transaction to the consensus node (for example, the consensus node 11*b* in the consensus network 300*a*) of the consensus network. In this case, the consensus node (for example, the consensus node 11*b* in the consensus network 300*a*) packages the transaction data into a block, so that consensus can be subsequently performed with another consensus node, and after the consensus is passed, the block for which the consensus is passed may be written into the blockchain ledger of the consensus network (for example, the consensus network 300*a*) in which the block is located.

A smart contract (also referred to as service processing data) may be deployed on the blockchain. The smart contract may be understood as Turing-complete code executed by blockchain nodes (that is, consensus nodes). Any logic may be executed through the smart contract to obtain a result. A blockchain transaction (for example, the foregoing target on-chain transaction) may invoke a smart contract, and code of the invoked smart contract is executed on all consensus nodes. One or more smart contracts may be deployed on the blockchain (for example, the blockchain 11*e*) of the consensus network (for example, the consensus network 300*a*). These smart contracts may be distinguished by using a contract invoking address, a contract identity document (ID), or a processing data name (that is, a contract name). In addition, an object operation transaction initiated by a service object may also carry the contract invoking address, the contract identity document, or the processing data name of the smart contract (service processing data, that is, a service contract), to specify a smart contract (for example, service processing data, that is, a service contract) that needs to be run.

The foregoing scenarios are merely examples, and do not constitute a limitation on disclosure scenarios of the technical solutions provided in the embodiments of this disclosure. The technical solutions of this disclosure may also be applied to other scenarios. For example, a person of ordinary skill in the art may learn that, with evolution of a system architecture and emergence of a new service scenario, the technical solutions provided in the embodiments of this disclosure are also applicable to similar technical problems.

Figure 3:
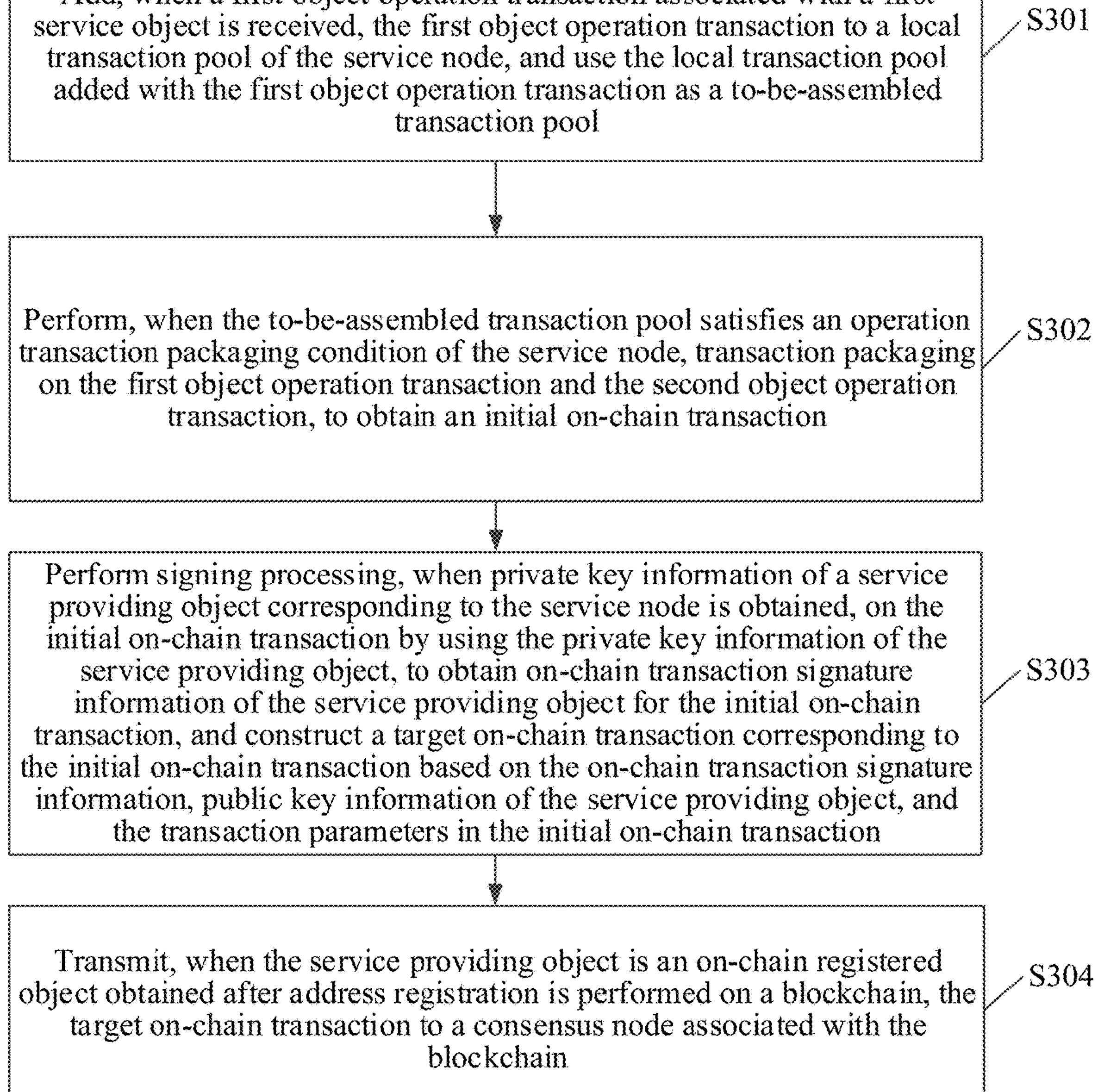
FIG. 3 is an example schematic flowchart of a data processing method for a blockchain according to an embodiment of this disclosure.

Further, referring to FIG. 3, FIG. 3 is a schematic flowchart of a data processing method for a blockchain according to an embodiment of this disclosure. The method may be performed by a service node, for example, the service node 100*a* in FIG. 1. The method may include at least the following operations S301 and S304:

S301: Add, when a first object operation transaction associated with a first service object is received, the first object operation transaction to a local transaction pool of the service node, and use the local transaction pool added with the first object operation transaction as a to-be-assembled transaction pool. Transactions in the to-be-assembled transaction pool include the first object operation transaction and a second object operation transaction different from the first object operation transaction. The second object operation transaction is an object operation transaction submitted by a second service object (that is, the second object operation transaction herein may be operation data submitted by the second service object). Both the second service object and the first service object are off-chain registered objects after object registration is performed locally at the service node (that is, the second object operation transaction herein may be operation data submitted by the second service object).

In this embodiment of this disclosure, the object registration herein means that a user identifier (that is, an object identifier) and an address submitted by a user (that is, a service object) may be registered and written into object registration service information on the service node. The object registration service information herein may be specifically a user list. In other words, the object registration herein may specifically refer to a registration operation performed, on the service node, for an object identifier and an address submitted by a service object, and the service object herein may specifically include, but is not limited to, the first service object and the second service object.

Therefore, when a service object performs object registration, the service node may write, into the user list, a user identifier (that is, an object identifier) and an address submitted by a user (that is, the service object). Specifically, the service node may perform a registration operation on the user identifier (that is, the object identifier) and the address submitted by the user (that is, the service object) that currently needs to be registered, to establish a mapping relationship between the object identifier and the address of the service object, and then may register the object identifier of the service object and the address that has the mapping relationship with the object identifier of the service object into the user list maintained by the service node. In this way, because a consensus node (for example, the foregoing consensus node) on a blockchain does not directly receive a registration transaction forwarded by the service node for the address of the service object, certainly, there is no need to perform address registration for the address of the service object on the blockchain. That is, there is no phenomenon that one to two registration transactions for the address of the service object are reflected during address registration, so that node storage pressure of the consensus node (for example, the foregoing consensus node) on the blockchain can be effectively relieved.

The service node has an operation transaction pool, also referred to as an operation transaction packaging pool, configured for storing an object operation transaction submitted by an off-chain registered object. Further, when the operation transaction pool of the service node satisfies an operation transaction packaging condition of the service object, the object operation transactions in the operation transaction pool may be packaged. For example, when a transaction quantity of the object operation transactions in the operation transaction pool of the service node reaches a specific threshold, the object operation transactions in the operation transaction pool may be packaged.

The local transaction pool may be an operation transaction pool not added with the first object operation transaction, and the to-be-assembled transaction pool may be an operation transaction pool added with the first object operation transaction. Both the local transaction pool and the to-be-assembled transaction pool may be added with the second object operation transaction. The local transaction pool and the to-be-assembled transaction pool may be operation transaction pools that store different object operation transactions, and essentially, are still operation transaction pools corresponding to the service node and configured for storing object operation transactions submitted by off-chain registered objects.

When receiving an object operation transaction submitted by any service object, the service node may determine whether the service object submitting the object operation transaction is a service object that has performed object registration on the service node and is successfully registered (that is, verify whether the service object is an off-chain registered object). If yes, an object operation transaction submitted by a service object that is an off-chain registered object is added to the operation transaction pool of the service node. If not, an object operation transaction submitted by a service object that is not an off-chain registered object is not added to the operation transaction pool of the service node, and prompt information may further be returned to the service object that is not an off-chain registered object, to prompt that the service object is not registered, the object operation transaction fails to be submitted, and the like.

Specifically, the service node may query, when receiving the first object operation transaction submitted by the first service object by using a first terminal, object registration service information locally stored on the service node for an off-chain registered object matching the first service object. Because an object identifier of a service object that has performed object registration on the service node and is successfully registered is stored in the object registration service information, when the service node receives the first object operation transaction submitted by the first service object by using the first terminal, if transaction parameters of the first object operation transaction carry the object identifier of the first service object, the service node may obtain the object identifier of the first service object from the transaction parameters of the first object operation transaction, and then may query the object registration service information for whether there is an object identifier matching the object identifier of the first service object. If it is found that there is an object identifier matching the object identifier of the first service object, the service node may add the first object operation transaction to the local transaction pool of the service node when determining the first service object as the off-chain registered object. In other words, in this embodiment of this disclosure, if an off-chain registered object matching the first service object is found by using the object registration service information maintained by the service node, the first object operation transaction is added to the local transaction pool of the service node.

The object registration service information stored on the service node may be configured for storing information about a service object that is successfully registered after a registration operation is performed by using a registration service provided by the service providing object. For example, the object registration service information may store an object identifier of the service object that is successfully registered after a registration operation is performed by using the registration service (that is, an off-chain registered object). Further, matching may be performed based on the object identifier of the first service object carried in the object operation transaction and the object identifier in the object registration service information. If there is an object identifier that matches the object identifier of the first service object in the object identifier in the object registration service information, it is determined that an off-chain registered object matching the first service object is found. In other words, in this case, the first service object herein is an off-chain registered object.

Specifically, the service node may receive the second object operation transaction associated with the second service object, add the second object operation transaction to an initial transaction pool of the service node when it is determined that the second service object is an off-chain registered object after object registration is performed locally at the service node, and use the initial transaction pool added with the second object operation transaction as the local transaction pool of the service node.

The initial transaction pool may be an operation transaction pool not added with the second object operation transaction, and the local transaction pool may be an operation transaction pool added with the second object operation transaction, that is, the foregoing transaction pool not added with the first object operation transaction. For a method for determining that the second service object is an off-chain registered object after object registration is performed locally at the service node, references may be made to the foregoing related description of determining that the first service object is an off-chain registered object after an object registration is performed locally at the service node. That is, the object registration service information locally stored on the service node is queried for the off-chain registered object matching the first service object, and details are not described herein again.

The quantity of second object operation transactions may be one or more, which is merely an exemplary description herein, and does not limit the quantity of object operation transactions in the operation transaction pool of the service node.

S302: Perform, when the to-be-assembled transaction pool satisfies an operation transaction packaging condition of the service node, transaction packaging on the first object operation transaction and the second object operation transaction, to obtain an initial on-chain transaction.

The operation transaction packaging condition of the service node may be a condition for performing transaction packaging on the object operation transaction in the operation transaction pool of the service node. The initial on-chain transaction may be a to-be-signed on-chain transaction obtained after the first object operation transaction and the second object operation transaction are packaged, that is, the initial on-chain transaction is a to-be-signed on-chain transaction. The to-be-signed on-chain transaction refers to a transaction when the initial on-chain transaction is to be signed by the service providing object. That is, the to-be-signed on-chain transaction herein is essentially a transaction when the service node performs a signing operation by using private key information of a service execution object. Specifically, the initial on-chain transaction is a transaction for which transaction signing is to be performed by using a private key (that is, private key information) of a service operation object (that is, the foregoing service party). In addition, because the object operation transaction herein and the on-chain transaction obtained through packaging have the same data structure, the first object operation transaction and the second object operation transaction in the transaction parameters of the initial on-chain transaction are transactions signed by using a private key of a corresponding service object. For example, the first object operation transaction in the initial on-chain transaction is a transaction signed by using the private key of the first service object (that is, the private key information of the first service object), and the second object operation transaction in the initial on-chain transaction is a transaction signed by using the private key of the second service object (that is, the private key information of the second service object). In some embodiments, the operation transaction packaging condition may be that the transaction quantity of object operation transactions in the operation transaction pool reaches a specific threshold. For example, the threshold is 20. When the transaction quantity of object operation transactions (including the first object operation transaction and the second object operation transaction) in the operation transaction pool reaches 20, transaction packaging may be performed on the 20 object operation transactions, to obtain the initial on-chain transaction. In some embodiments, the operation transaction packaging condition may alternatively be that a trigger time for operation transaction packaging is reached. For example, transaction packaging is performed at an interval of 1 minute. In this case, when 1 minute passes since previous transaction packaging, transaction packaging may be performed on an object operation transaction added to the operation transaction pool within the 1 minute, to obtain the initial on-chain transaction. A data structure of each object operation transaction is consistent with a data structure of the on-chain transaction, and has a transaction hash value, time information (a time stamp), a sender address, public key information of the sender, relevant parameters for invoking a smart contract, signature information, and the like.

Figure 4:
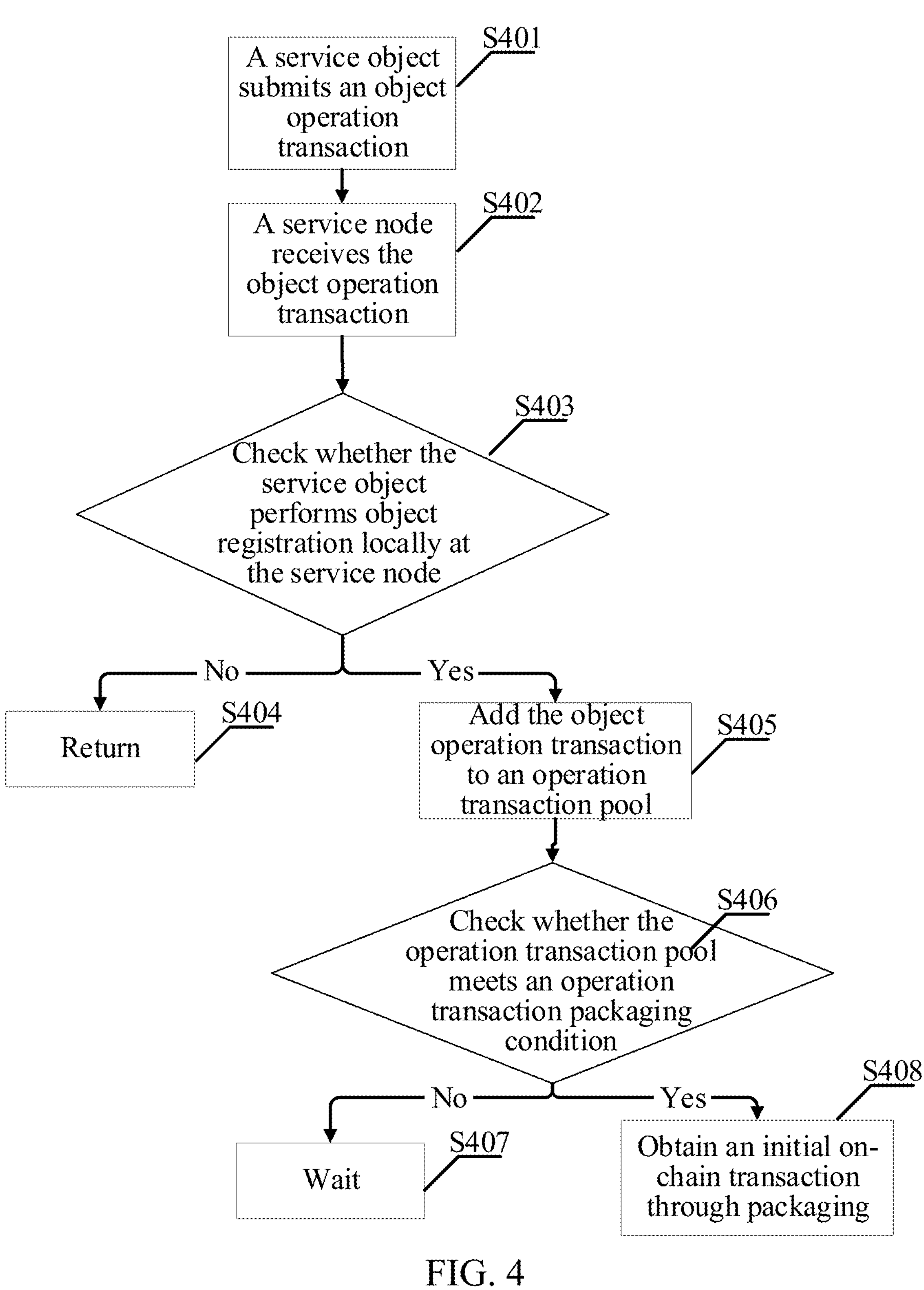
FIG. 4 is an example schematic flowchart of a process of determining an initial on-chain transaction according to an embodiment of this disclosure.

For example, a process of packaging an initial on-chain transaction is described herein with reference to FIG. 4. FIG. 4 is a schematic flowchart of a process of determining an initial on-chain transaction according to an embodiment of this disclosure. As shown in FIG. 4, a service object may submit an object operation transaction to a service node (operation S401), and then the service node may receive the object operation transaction submitted by the service object (operation S402). The service node may detect whether the service object performs object registration locally at the service node (that is, on the service node) (operation S403). If the service object does not perform object registration locally at the service node (that is, on the service node), the service object may return to (operation S404). For example, prompt information may be returned to a user terminal corresponding to the service object to prompt that the service object does not perform object registration locally at the service node. In some embodiments, as shown in FIG. 4, if the service object has performed object registration locally at the service node (that is, on the service node), the object operation transaction may be added to an operation transaction pool (operation S405). Further, the service node may detect whether the operation transaction pool satisfies an operation transaction packaging condition (operation S406). For a specific detection method, refer to the foregoing description. Details are not described herein again. If the operation transaction pool does not satisfy the operation transaction packaging condition, it may wait (operation S407) until the operation transaction pool satisfies the operation transaction packaging condition. If the operation transaction pool satisfies the operation transaction packaging condition, an initial on-chain transaction may be obtained through packaging (operation S408).

When the service node obtains the initial on-chain transaction through packaging, object operation transactions in a to-be-assembled transaction pool may be sorted according to a time sequence of operation time information, the sorted object operation transactions are sequentially used as transaction parameters in the initial on-chain transaction, and transaction assembly is performed on determined transaction parameters, to obtain the initial on-chain transaction. In other words, in the process of obtaining the initial on-chain transaction through parsing by the service node, if the object operation transactions in the to-be-assembled transaction pool include a first object operation transaction and a second object operation transaction, the service node may specifically perform transaction sorting on the first object operation transaction and the second object operation transaction in the to-be-assembled transaction pool when performing transaction sorting on the object operation transactions in the to-be-assembled transaction pool, and then may sequentially use the sorted object operation transactions (that is, the sorted first object operation transaction and second object operation transaction) as transaction parameters in the initial on-chain transaction, so as to perform a packaging operation (or a transaction assembly operation) on the transaction parameters in the initial on-chain transaction, so that a to-be-signed on-chain transaction obtained after the packaging operation can be used as the initial on-chain transaction. The packaging operation (or the transaction assembly operation) herein is specifically an operation by which the service node may package the sorted object operation transactions in batches into one to-be-signed on-chain transaction. Specifically, the service node may perform transaction assembly on all transaction parameters in the initial on-chain transaction based on a data structure indicated by the packaging operation. For example, the data structure of the initial on-chain transaction may include at least the first object operation transaction, the second object operation transaction, and a transaction hash value of the initial on-chain transaction, time information (a time stamp), a sender address (for example, an address of a service providing object), public key information of the sender (for example, public key information corresponding to the address of the service providing object), relevant parameters for invoking a smart contract, and signature information. In this case, because the initial on-chain transaction is a to-be-signed transaction, in the data structure of the initial on-chain transaction, a value of the signature information is a null value, and therefore, it may be equivalently considered that the transaction parameters of the initial on-chain transaction does not include the signature information of the service providing object. The hash value of the initial on-chain transaction is obtained after hash calculation is performed on the transaction parameter (for example, may be specifically a transaction parameter that does not include the signature information of the service providing object) of the initial on-chain transaction. When executing an object operation transaction subsequently, a consensus node on a blockchain may sequentially execute the object operation transaction based on a transaction sequence of object operation transactions, thereby ensuring reliability of executing the object operation transactions.

Specifically, the service node may determine operation time information of the first object operation transaction based on a time parameter in the first object operation transaction, and use the operation time information of the first object operation transaction as first operation time information; further, determine operation time information of the second object operation transaction based on a time parameter in the second object operation transaction, and use the operation time information of the second object operation transaction as second operation time information; and further, perform transaction sorting on the first object operation transaction and the second object operation transaction based on the first operation time information and the second operation time information, using the first object operation transaction and the second object operation transaction obtained through transaction sorting as the transaction parameters in the initial on-chain transaction, and perform transaction assembly on the determined transaction parameters, to obtain the initial on-chain transaction through assembly.

The first object operation transaction and the second object operation transaction each may include a time parameter, and a parameter value of the time parameter may be the operation time information of the first object operation transaction or the second object operation transaction, also referred to as time stamp information. The transaction sorting performed on the first object operation transaction and the second object operation transaction is merely an exemplary description herein. In an actual application process, a larger quantity of object operation transactions may be sorted. According to the foregoing description, when the service node adds the first object operation transaction to the local transaction pool, the second object operation transaction already exists in the local transaction pool. Therefore, the operation time information of the second object operation transaction is earlier than the operation time information of the first object operation transaction. Therefore, when the first object operation transaction and the second object operation transaction are sorted, if transaction sorting is performed in order of the operation time information from early to late, the second object operation transaction needs to be sorted before the first object operation transaction.

For example, operation time information of an object operation transaction Y1 is T1, operation time information of an object operation transaction Y2 is T2, operation time information of an object operation transaction Y3 is T3, operation time information of an object operation transaction Y4 is T4, and operation time information of an object operation transaction Y5 is T5. If an order of the operation time information from early to late is: T1, T2, T3, T4, and T5, the object operation transactions are sorted according to a time order of the operation time information of the object operation transactions. In this case, the stored object operation transactions may be specifically {Y1, Y2, Y3, Y4, Y5}, and then each object operation transaction may be sequentially used as the transaction parameter of the initial on-chain transaction, so that the transaction parameters are sequentially assembled, to obtain the initial on-chain transaction. In other words, in this embodiment of this disclosure, the sorted object operation transactions may be packaged in batches into one initial on-chain transaction in the form of transaction parameters.

In some embodiments, when the initial on-chain transaction is obtained through packaging, aggregated signing may be further performed on operation signature information in each object operation transaction that needs to be packaged, and one piece of aggregated signature information is obtained, so that the aggregated signature information and each object operation transaction may be used together as a transaction parameter of the initial on-chain transaction, and then the initial on-chain transaction may be obtained through packaging based on the transaction parameter of the initial on-chain transaction.

Specifically, the service node may determine, based on a parameter value of the signature parameter in the first object operation transaction, first operation signature information obtained after the first service object performs off-chain transaction signing on the first object operation transaction. The first operation signature information is obtained by performing off-chain transaction signing processing on the first object operation transaction by using the private key information of the first service object (that is, the first operation signature information herein is a digital signature obtained after the transaction hash value of the first object operation transaction is encrypted by using the private key information of the first service object). Further, the service node may determine, based on a parameter value of a signature parameter in the second object operation transaction, second operation signature information obtained after the second service object performs off-chain transaction signing on the second object operation transaction. The second operation signature information is obtained by performing off-chain transaction signing processing on the second object operation transaction by using the private key information of the second service object (that is, the second operation signature information herein is a digital signature obtained after the transaction hash value of the second object operation transaction is encrypted by using the private key information of the second service object). Further, the service node may aggregate the first operation signature information and the second operation signature information to obtain aggregated signature information, and adjust the parameter value of the signature parameter in the first object operation transaction and the parameter value of the signature parameter in the second object operation transaction to null values. Further, the service node may use the aggregated signature information, the first object operation transaction when the parameter value of the signature parameter is a null value, and the second object operation transaction when the parameter value of the signature parameter is a null value as the transaction parameters in the initial on-chain transaction, and perform packaging based on the transaction parameters in the initial on-chain transaction, to obtain the initial on-chain transaction.

Each object operation transaction includes a signature parameter, and a parameter value of the signature parameter of the object operation transaction received by the service node is operation signature information for off-chain transaction signing of the object operation transaction by the service object, such as the first operation signature information and the second operation signature information.

The first operation signature information and the second operation signature information are aggregated to obtain aggregated signature information. The aggregated signature information herein may be specifically obtained by aggregating the first operation signature information and the second operation signature information based on a BLS signature algorithm (a signature algorithm). When the aggregated signature information (also referred to as an aggregated signature) of the first operation signature information in the first object operation transaction and the second operation signature information in the second object operation transaction is obtained, the parameter values of the original signature parameters of the first object operation transaction and the second object operation transaction may be determined as null values, and then original operation signature information in the first object operation transaction and the second object operation transaction may not be verified subsequently. In this embodiment of this disclosure, for the BLS signature algorithm, signatures (for example, signature $s_1$, signature $s_2$, . . . , signature$s_n$) of object operation transactions of n service objects may be aggregated into one aggregated signature S. Then, when verifying the aggregated signature S, the consensus node on the blockchain may invoke a specific signature verification interface to verify correctness of the aggregated signature S by using public keys of the n service objects and data signed by the n service objects.

When the aggregated signature information, the first object operation transaction when the parameter value of the signature parameter is a null value, and the second object operation transaction when the parameter value of the signature parameter is a null value are used as the transaction parameters in the initial on-chain transaction, and when the initial on-chain transaction is obtained through packaging, transaction sorting may be performed on the first object operation transaction when the parameter value of the signature parameter is a null value and the second object operation transaction when the parameter value of the signature parameter is a null value according to the first operation time information of the first object operation transaction and the second operation time information of the second object operation transaction. The first object operation transaction when the parameter value of the signature parameter is a null value and the second object operation transaction when the parameter value of the signature parameter is a null value after transaction sorting are used as the transaction parameters in the initial on-chain transaction, and transaction assembly is performed on the determined transaction parameters in the initial on-chain transaction, to obtain the initial on-chain transaction through assembly.

S303: Perform signing processing, when private key information of a service providing object corresponding to the service node is obtained, on the initial on-chain transaction by using the private key information of the service providing object, to obtain on-chain transaction signature information of the service providing object for the initial on-chain transaction, and construct a target on-chain transaction corresponding to the initial on-chain transaction based on the on-chain transaction signature information, public key information of the service providing object, and the transaction parameters in the initial on-chain transaction.

The target on-chain transaction is a signed transaction, and transaction parameters in the target on-chain transaction include the on-chain transaction signature information, the public key information of the service providing object, and the transaction parameters in the initial on-chain transaction. The on-chain transaction signature information is a digital signature obtained after the hash value of the initial on-chain transaction is encrypted by using the private key information of the service providing object.

The initial on-chain transaction is signed (for example, on-chain signing processing) by using the private key information of the service providing object (also referred to as the private key information of the service providing object), and transaction signing may performed by using an ECDSA (a signature algorithm) signature algorithm. When receiving the target on-chain transaction, the consensus node on the blockchain may obtain the on-chain transaction signature information in the target on-chain transaction and may further verify validity of the target on-chain transaction by using the hash value of the transaction parameter in the initial on-chain transaction signed by using the private key of the service providing object, the public key information of the service providing object, and the hash value of the transaction parameter in the initial on-chain transaction, so as to ensure that the target on-chain transaction is not tampered with. For ease of description, the private key information of the service providing object may be denoted as service private key information.

The private key information of the service providing object may be a key configured for signing the initial on-chain transaction, and the public key information of the service providing object (also referred to as public key information of the service providing object) is generated based on the private key information of the service providing object. In other words, the private key information of the service providing object and the public key information of the service providing object herein may be configured for forming a key pair, and the key pair herein is an asymmetric key pair. In this embodiment of this disclosure, the service node may perform transaction signing on the initial on-chain transaction by using the private key information of the service providing object (that is, perform signing processing), to obtain on-chain transaction signature information of the service providing object for the initial on-chain transaction. Specifically, the service node may encrypt the hash value of the initial on-chain transaction by using the private key information of the service providing object (for example, the hash value of the initial on-chain transaction may be specifically a hash value of a transaction parameter in the initial on-chain transaction), and may further use the encrypted hash value of the initial on-chain transaction (for example, the encrypted hash value of the transaction parameter in the initial on-chain transaction) as a digital signature of the initial on-chain transaction. In other words, the digital signature of the initial on-chain transaction herein is the foregoing on-chain transaction signature information. In other words, the signing processing involved in this embodiment of this disclosure is a signing operation performed when the service node may encrypt the hash value of the initial on-chain transaction by using the private key information of the service providing object. In this case, the on-chain transaction signature information is a digital signature, obtained by the service node after performing the signing operation, for the initial on-chain transaction. The hash value of the initial on-chain transaction herein is determined by the transaction parameters in the initial on-chain transaction. For a specific process of determining the transaction parameters in the initial on-chain transaction herein, references may be made to the foregoing description of the specific process of obtaining the initial on-chain transaction, and details are not described herein again. In this way, the service node may append the on-chain transaction signature information to the initial on-chain transaction, and may further submit the target on-chain transaction to the consensus node (for example, the foregoing consensus node) on the blockchain when the initial on-chain transaction carrying the on-chain transaction signature information is used as the target on-chain transaction. In this case, the consensus node may perform signature verification on the on-chain transaction signature information in the target on-chain transaction when receiving the target on-chain transaction. Specifically, the consensus node may decrypt the on-chain transaction signature information by using the public key information of the target service object carried in the target on-chain transaction, to obtain the hash value of the transaction parameter of the initial on-chain transaction through decryption. In this case, the consensus node may further recalculate the hash value of the transaction parameter of the initial on-chain transaction based on the transaction parameter of the initial on-chain transaction carried in the target on-chain transaction, and then may determine whether the hash value of the transaction parameter of the initial on-chain transaction obtained through recalculation is consistent with the hash value of the transaction parameter of the initial on-chain transaction obtained through decryption. If they are consistent, it may be determined that the target on-chain transaction that currently needs to be on-chain is valid, and the transaction parameters (for example, the first object operation transaction and the second object operation transaction) of the initial on-chain transaction carried in the target on-chain transaction are not tampered with without authorization. In other words, when receiving the target on-chain transaction, the consensus node may perform signature verification (that is, decrypt) on the on-chain transaction signature information in the target on-chain transaction based on the public key information of the service providing object in the target on-chain transaction, and when the signature verification is successful, may obtain the transaction parameter of the initial on-chain transaction, so that parameter parsing can be performed on the transaction parameter of the initial on-chain transaction, to obtain the first object operation transaction and the second object operation transaction. For ease of description, the public key information of the service providing object may be denoted as service public key information.

S304: Transmit, when the service providing object is an on-chain registered object obtained after address registration is performed on a blockchain, the target on-chain transaction to a consensus node associated with the blockchain, so that the consensus node performs, when obtaining the on-chain transaction signature information through parsing, signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the first object operation transaction corresponding to the first service object and the second object operation transaction corresponding to the second service object.

The on-chain registered object may be an object that performs address registration on the blockchain. That is, in this embodiment of this disclosure, before the service providing object is registered to become the on-chain registered object, the service node may write the address of the service providing object into the blockchain in a registration transaction manner by using the consensus node. For a process of performing address registration on the blockchain by the service providing object, refer to the foregoing description of the specific process of address registration. Details are not described herein again.

The service providing object may transmit, to the consensus node on the blockchain, the target on-chain transaction packaged with a plurality of object operation transactions. The consensus node on the blockchain may be specifically a consensus node (for example, the foregoing target consensus node) in the blockchain network in which the blockchain is located. In this way, the consensus node (for example, the foregoing target consensus node) may subsequently perform block on-chaining on the block in which the target on-chain transaction is located. The block in which the target on-chain transaction is located is obtained after the consensus node performs transaction packaging on a plurality of transactions that include the target on-chain transaction and that are obtained from the transaction packaging pool. In this embodiment of this disclosure, the consensus node performs signature verification on the target on-chain transaction by using the public key information of the service providing object, and when the signature verification is successful, it may be determined that the target on-chain transaction is valid, and then the valid target on-chain transaction may be added to the transaction packaging pool of the consensus node. In this way, the consensus node may execute a plurality of on-chain transactions in the block before performing block on-chaining on the block. Specifically, in this embodiment of this disclosure, the consensus node may execute the target on-chain transaction in the block when executing the block, so that the plurality of object operation transactions included in the target on-chain transaction can be further executed. In this embodiment of this disclosure, there is no need for each service object to perform address registration on the blockchain, and only service providing objects configured for providing registration services for the service objects need to perform address registration on the blockchain. In this way, after the service objects (namely, the foregoing c-end users) perform object registration on the service node, when the service node receives a plurality of object operation transactions submitted by the service objects (namely, the foregoing c-end users), the object operation transactions may be packaged into one transaction at a time, and then the transaction packaged on the service node may be referred to as the foregoing on-chain transaction. Further, when transaction on-chaining is performed on the on-chain transaction by using the consensus node, on-chaining of a plurality of object operation transactions in the on-chain transaction can be implemented together. In other words, in this embodiment of this disclosure, there is no need to register and write addresses of massive service objects into the blockchain, so that a phenomenon of a large quantity of registration transactions generated when a large quantity of service objects perform address registration on the blockchain can be avoided, thereby avoiding occupying storage space on the consensus node by the large quantity of registration transactions of the service objects, and avoiding a waste of storage resources of the storage space.

In this embodiment of this disclosure, when the service object needs to submit one object operation transaction, the service object does not need to perform on-chain registration on the blockchain (that is, the foregoing address registration), but performs object registration on the service node corresponding to the service providing object in the blockchain. In this way, when the service node in the blockchain may package object operation transactions submitted by a plurality of off-chain registered objects (that is, the foregoing plurality of service objects that have performed object registration) into one target on-chain transaction, and then when the service node uploads the target on-chain transaction obtained through packaging to the consensus node on the blockchain, it may be equivalent to implementing batch uploading of object operation transactions submitted by a plurality of off-chain registered objects in the target on-chain transaction, thereby improving transaction uploading efficiency of the service node for a large quantity of object operation transactions. Similarly, for the consensus node, batch receiving of a large quantity of object operation transactions may be implemented by using the target on-chain transaction, thereby improving transaction acquisition efficiency of the consensus node for a large quantity of operation transactions. The service object does not need to perform address registration on the blockchain, and only the service providing object needs to perform address registration on the blockchain. In this way, because the consensus node does not receive the registration transaction of performing address registration on the blockchain by the service object, a quantity of registration transactions on the blockchain may be reduced from the root, thereby reducing the problem of occupying the registration transaction on the storage space of the consortium blockchain. In addition, the service objects are not directly registered on the blockchain (for example, address registration), but are registered on the service node corresponding to the service providing object in the blockchain (for example, object registration), so that a risk that on-chain permissions of addresses corresponding to private keys of the off-chain service objects are read without authorization due to leakage of keys (that is, the private keys) of the off-chain registered objects can be reduced as much as possible.

Figures 5, 6:
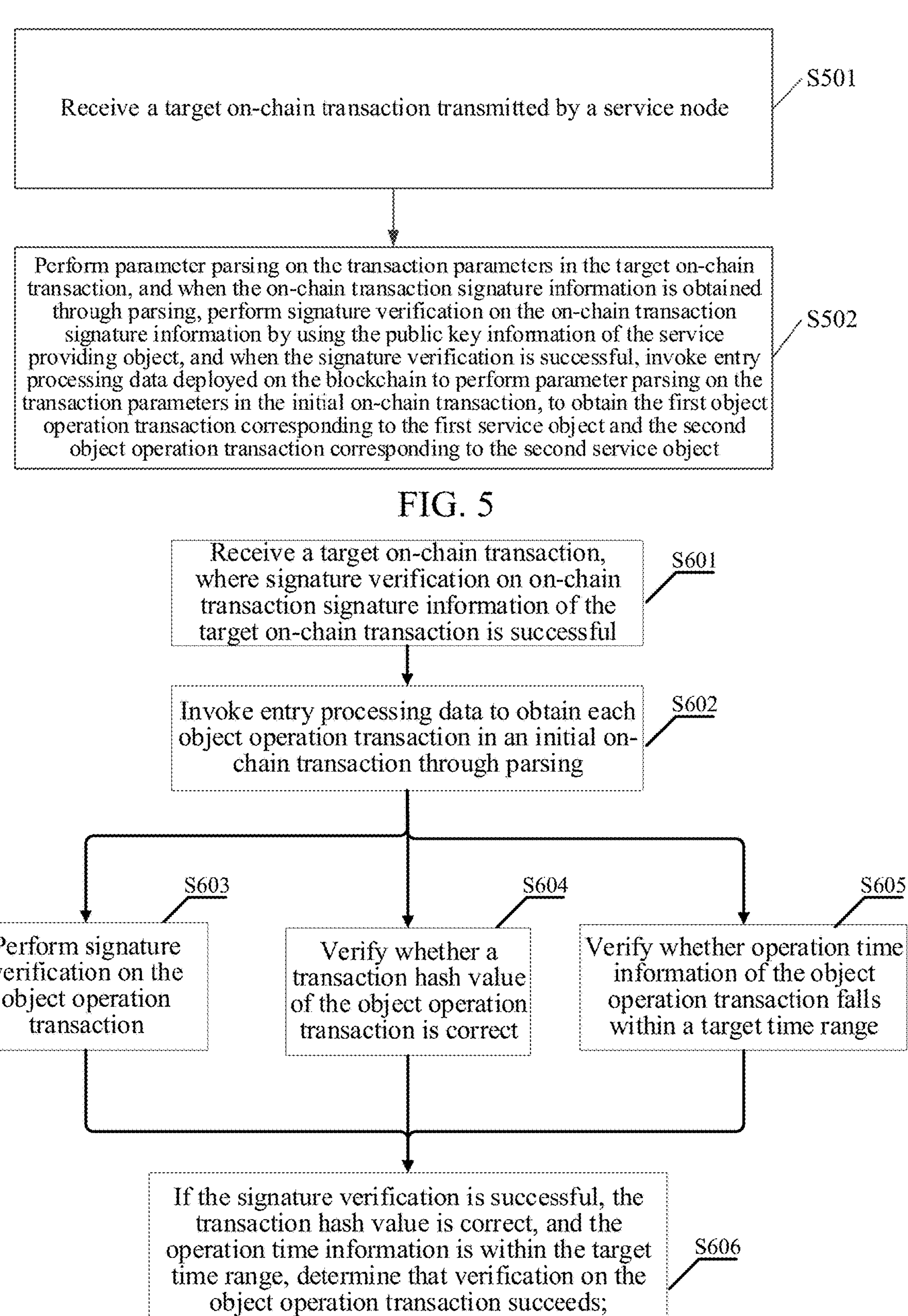
FIG. 5 is an example schematic flowchart of a data processing method for a blockchain according to an embodiment of this disclosure.
FIG. 6 is an example schematic flowchart of an operation transaction verification process according to an embodiment of this disclosure.

Further, referring to FIG. 5, FIG. 5 is a schematic flowchart of a data processing method for a blockchain according to an embodiment of this disclosure. The method may be performed by a consensus node associated with a blockchain, for example, the consensus node 11*a* in FIG. 1. The method may include at least the following operations S501 and S502:

S501: Receive a target on-chain transaction transmitted by a service node.

A service providing object corresponding to the service node is an on-chain registered object obtained after address registration is performed on the blockchain. The address registration herein refers to a registration operation performed, on the consensus node, for an address submitted by the service providing object. The target on-chain transaction is constructed by the service node based on on-chain transaction signature information, public key information of the service providing object, and transaction parameters in an initial on-chain transaction, the on-chain transaction signature information is obtained by the service node by signing the initial on-chain transaction by using private key information of the service providing object, and the initial on-chain transaction is obtained by the service node by performing transaction packaging on a first object operation transaction and a second object operation transaction different from the first object operation transaction. The first object operation transaction is operation data (that is, an object operation transaction) submitted by a first service object, the second object operation transaction is operation data (that is, an object operation transaction) submitted by a second service object, and both the second service object and the first service object are off-chain registered objects. The off-chain registered object is a service object that performs object registration on the service node and is successfully registered. The object registration refers to a registration operation performed, on the service node, for an object identifier and an address submitted by the service object. The service object includes the first service object and the second service object. The target on-chain transaction is a signed transaction, and transaction parameters in the target on-chain transaction include the on-chain transaction signature information, the public key information of the service providing object, and the transaction parameters in the initial on-chain transaction. The initial on-chain transaction is a to-be-signed transaction, and the transaction parameters in the initial on-chain transaction include the first object operation transaction and the second object operation transaction.

For a manner of determining the target on-chain transaction, references may be made to the foregoing related descriptions, and details are not described herein again.

S502: Perform parameter parsing on the transaction parameters in the target on-chain transaction, and when the on-chain transaction signature information is obtained through parsing, perform signature verification on the on-chain transaction signature information by using the public key information of the service providing object, and when the signature verification is successful, invoke entry processing data deployed on the blockchain to perform parameter parsing on the transaction parameters in the initial on-chain transaction, to obtain the first object operation transaction corresponding to the first service object and the second object operation transaction corresponding to the second service object.

The entry processing data (that is, an entry contract) is a contract for performing parameter parsing on transaction parameters in an on-chain transaction submitted by the service node. When receiving the target on-chain transaction, the consensus node may perform signature verification on the on-chain transaction signature information in the target on-chain transaction based on the public key information of the service providing object in the target on-chain transaction, when the signature verification is successful, may obtain the transaction parameters in the initial on-chain transaction, and then may invoke the entry processing data to perform parameter parsing on the transaction parameters of the initial on-chain transaction, to obtain the first object operation transaction and the second object operation transaction.

Specifically, when the signature verification is successful, the consensus node may determine that the target on-chain transaction is valid, and may store the valid target on-chain transaction into a blockchain transaction pool corresponding to the consensus node. In this way, when the blockchain transaction pool satisfies an on-chain transaction packaging condition of the blockchain, the consensus node packages the target on-chain transaction into a target block, may perform block consensus on the target block, and write the target block into the blockchain when block consensus is reached for the target block.

The blockchain transaction pool may be a transaction pool that is used in the consensus node to store an on-chain transaction whose signature verification is successful. In this way, when the blockchain transaction pool satisfies an on-chain transaction packaging condition, the on-chain transactions (including the target on-chain transaction) in the on-chain transaction pool may be packaged into one block (that is, the target block), to perform block consensus on the block (that is, the target block) obtained through packaging, and then, when block consensus is successful, the block with successful consensus may be on-chained to the blockchain. In this embodiment of this disclosure, on-chaining the target block including the target on-chain transaction to the blockchain may be equivalent to on-chaining a large quantity of object operation transactions in the target on-chain transaction in batches. In some embodiments, the on-chain transaction packaging condition may be that a transaction quantity of on-chain transactions in the blockchain transaction pool reaches a specific threshold. For example, if the threshold is 20, when the transaction quantity of on-chain transactions (including the target on-chain transaction) in the blockchain transaction pool reaches 20, the 20 on-chain transactions may be packaged into the target block. In some embodiments, the on-chain transaction packaging condition may alternatively be that a trigger time for packaging on-chain transactions is reached. For example, an operation of packaging on-chain transactions into a block is performed at an interval of 1 minute. In this case, when 1 minute passes since a previous operation of packaging on-chain transactions into a block, on-chain transactions (including the target on-chain transaction) added to the blockchain transaction pool within the 1 minute may be packaged into a block. The target on-chain transaction obtained by packaging a plurality of object operation transactions by the service node behaves consistently with a conventional transaction in terms of performance and universality. For example, an on-chaining process of the target on-chain transaction is the same as an on-chaining process of the conventional transaction.

Performing block consensus on the target block may be understood as follows: The consensus node may broadcast the target block to another consensus node of the consensus network. In this way, when receiving the target block broadcast by the consensus node, the another consensus node may further execute an on-chain transaction in the target block (for the foregoing target on-chain transaction, each object operation transaction in the target on-chain transaction is executed) to obtain a transaction execution result of the on-chain transaction in the target block, and then verify whether transaction execution results of the on-chain transaction of the consensus nodes for the target block are consistent, that is, perform voting consensus on the transaction execution result of the on-chain transaction of the target block. If a result of the voting consensus satisfies a specific condition, block consensus is reached for the target block, and then the target block may be written into the blockchain.

If the initial on-chain transaction includes aggregated signature information, where the aggregated signature information herein is obtained by performing aggregated signing on operation signature information in the first object operation transaction and operation signature information in the second object operation transaction, after obtaining the first object operation transaction and the second object operation transaction through parsing from the transaction parameters of the initial on-chain transaction, the consensus node may perform signature verification on the aggregated signature information by using public key information of the first service object in the first object operation transaction and public key information of the second service object in the second object operation transaction.

Specifically, the initial on-chain transaction includes the first object operation transaction, the second object operation transaction, and the aggregated signature information, and both a parameter value of a signature parameter in the first object operation transaction and a parameter value of a signature parameter in the second object operation transaction are null values. The aggregated signature information is obtained by aggregating first operation signature information in the first object operation transaction and second operation signature information in the second object operation transaction. The first operation signature information is obtained by the first service object after performing transaction signing on the first object operation transaction by using private key information of the first service object. The second operation signature information is obtained by the second service object after performing transaction signing on the second object operation transaction by using private key information of the second service object. In this case, this embodiment of this disclosure may further include the following: The consensus node may determine public key information of the first service object from the first object operation transaction, and determine public key information of the second service object from the second object operation transaction. Further, the consensus node may perform signature verification on the aggregated signature information based on the public key information of the first service object and the public key information of the second service object, and when the signature verification is successful, use the first object operation transaction as a first signature-verified operation transaction, and use the second object operation transaction as a second signature-verified operation transaction.

In this embodiment of this disclosure, signature verification may be performed once on aggregated signature information obtained by aggregating signatures based on public key information of each service object, that is, when the signature verification is successful, batch signature verification of a plurality of object operation transactions in the initial on-chain transaction may be quickly implemented. In addition, in a process of constructing the target on-chain transaction, by introducing the aggregated signature information into the transaction parameters of the initial on-chain transaction, there is no need to retain object signature information in each object operation transaction, so that during construction of the target on-chain transaction, a parameter value of a signature parameter in each object operation transaction is set to a null value. In this way, an excessively long signature verification time caused by signature verification performed on the object signature information in each object operation transaction by using the public key information of each service object can be effectively avoided, and then one-time signature verification of the aggregated signature information can be implemented by using the public key information of the service objects, thereby improving signature verification efficiency. For a method for determining aggregated signature information involved in this embodiment of this disclosure, refer to the foregoing description. Details are not described herein again. The first object operation transaction includes the public key information of the first service object, and the second object operation transaction includes the public key information of the second service object, so that signature verification can be performed on the aggregated signature information based on the public key information of the first service object and the public key information of the second service object. Specifically, signature verification may be performed based on a BLS signature algorithm.

In this embodiment of this disclosure, when signature verification is performed on the aggregated signature information and the signature verification is successful, it may be equivalent to that signature verification of each object operation transaction in the initial on-chain transaction is completed in batches, and then each object operation transaction whose signature verification is successful may be referred to as a signature-verified operation transaction. For ease of distinction, the first object operation transaction may be referred to as a first signature-verified operation transaction, that is, the first signature-verified operation transaction herein may be the first object operation transaction after the signature verification is successful. Similarly, the second object operation transaction may be referred to as a second signature-verified operation transaction, that is, the second signature-verified operation transaction herein may be the second object operation transaction after the signature verification is successful. In other words, if signature verification is performed on the aggregated signature information, and when the signature verification is successful, it may indicate that operation signatures of all object operation transactions in the initial on-chain transaction are correct, all object operation transactions in the initial on-chain transaction may be determined as signature-verified operation transactions. That is, for a plurality of object operation transactions, signature verification only needs to be performed on the aggregated signature information once, so that costs of performing signature verification on these object operation transactions by using the entry processing data can be reduced, thereby improving signature verification efficiency. In addition, by introducing the aggregated signature information, it may be ensured that no signature of a corresponding service object (that is, operation signature information of the corresponding service object) needs to be stored in a signature parameter of any object operation transaction in the initial on-chain transaction. That is, the service node may determine a parameter value of the signature parameter in each object operation transaction as a null value when obtaining the aggregated signature information through aggregating, thereby avoiding occupation of storage space of the service node due to signatures of a large quantity of service objects, and further reducing storage costs of the service node.

When verifying the aggregated signature information in the target on-chain transaction, the consensus node needs to precompile a signature verification interface of a corresponding signature algorithm in a contract virtual machine. That is, the consensus node needs to precompile a signature verification interface configured for performing signature verification on the aggregated signature information determined by using the BLS signature algorithm. In this way, the consensus node may invoke, by using the entry processing data, the signature verification interface to perform signature verification on the aggregated signature information.

If signature verification is unsuccessful (that is, signature verification fails) on the aggregated signature information, the first object operation transaction or the second object operation transaction has been tampered with, but it cannot be distinguished whether signature verification fails on the first object operation transaction or the second object operation transaction, or whether signature verification fails on both the first object operation transaction and the second object operation transaction. In this case, the consensus node does not use an object operation transaction after signature verification fails (for example, the first object operation transaction after signature verification fails and/or the second object operation transaction after signature verification fails) as a signature-verified operation transaction, and the object operation transaction after signature verification fails may not be executed subsequently.

In some embodiments, if the initial on-chain transaction does not include the foregoing aggregated signature information, but the parameter value of the signature parameter of each object operation transaction in the transaction parameters of the initial on-chain transaction is still original operation signature information, the consensus node may separately perform signature verification on the operation signature information of each object operation transaction in the initial on-chain transaction.

Specifically, a parameter value of a signature parameter in the first object operation transaction is first operation signature information, and a parameter value of a signature parameter in the second object operation transaction is second operation signature information. The first operation signature information is obtained by the first service object after performing transaction signing on the first object operation transaction by using private key information of the first service object. The second operation signature information is obtained by the second service object after performing transaction signing on the second object operation transaction by using private key information of the second service object. In this case, this embodiment of this disclosure may further include: determining public key information of the first service object from the first object operation transaction, performing signature verification on the first operation signature information by using the public key information of the first service object in the first object operation transaction, and using the first object operation transaction as a first signature-verified operation transaction when the signature verification is successful; and further, determining public key information of the second service object from the second object operation transaction, performing signature verification on the second operation signature information by using the public key information of the second service object in the second object operation transaction, and using the second object operation transaction as a second signature-verified operation transaction when the signature verification is successful.

Similarly, when the operation signature information of the object operation transaction is being verified, a signature verification interface of a corresponding signature algorithm needs to be precompiled in the contract virtual machine. That is, a signature verification interface configured for performing signature verification on the operation signature information (such as the first operation signature information and the second operation signature information) in the object operation transaction is precompiled. The consensus node may invoke, by using the entry processing data, the signature verification interface to separately perform signature verification on the first operation signature information and the second operation signature information.

If the signature verification on the first operation signature information is unsuccessful, it means that the signature verification of the first object operation transaction fails. In this case, the first object operation transaction cannot be used as a signature-verified operation transaction, and the first object operation transaction whose signature verification is unsuccessful cannot be subsequently executed. If signature verification on the second operation signature information is unsuccessful, signature verification of the second object operation transaction fails. In this case, the second object operation transaction cannot be used as a signature-verified operation transaction, and the second object operation transaction whose signature verification is unsuccessful cannot be subsequently executed.

After the first object operation transaction and the second object operation transaction are obtained, transaction hash values and operation time information of the first object operation transaction and the second object operation transaction may be further verified. If the verification on the transaction hash values and the operation time information fails, the corresponding object operation transaction cannot be executed subsequently.

Specifically, transaction parameters of the first object operation transaction include a transaction hash value of the first object operation transaction and operation time information of the first object operation transaction. This embodiment of this disclosure may further include: performing hash calculation on the first object operation transaction by using the transaction hash value of the first object operation transaction as a first operation transaction hash value, to obtain a first to-be-verified hash value of the first object operation transaction, and performing hash comparison on the first operation transaction hash value and the first to-be-verified hash value, to obtain a first hash comparison result; further, using the operation time information of the first object operation transaction as first operation time information, and identifying a first time association result between the first operation time information and a target time range, the first time association result be configured for indicating that the first operation time information falls within the target time range or the first operation time information does not fall within the target time range; and further, using the first object operation transaction as a first valid operation transaction when the first hash comparison result indicates that the first operation transaction hash value remains consistent with the first to-be-verified hash value, and the first time association result indicates that the first operation time information falls within the target time range.

The first object operation transaction includes a transaction hash value X1. The consensus node may perform hash calculation on the first object operation transaction to obtain a first to-be-verified hash value Z1. In this case, a first hash comparison result may be obtained by performing hash comparison between X1 and Z1. The first hash comparison result is configured for indicating whether the transaction hash value X1 is consistent with the first to-be-verified hash value Z1. That is, it is equivalent to verifying that the transaction hash value of the first object operation transaction is correct. If the first hash comparison result is configured for indicating that the transaction hash value X1 is consistent with the first to-be-verified hash value Z1, the transaction hash value of the first object operation transaction is correct. If the first hash comparison result is configured for indicating that the transaction hash value X1 is not consistent with the first to-be-verified hash value Z1, the transaction hash value of the first object operation transaction is incorrect.

The consensus node may be configured to execute an object operation transaction within a target time range. Therefore, it is necessary to verify whether the first object operation transaction falls within the target time range. The target time range may be a time period of a specific length before the current time. For example, the target time range is 5 minutes before the current time, and the current time is system time.

If a transaction hash value of an object operation transaction is correct and the operation time is within the target time range, the object operation transaction may be a valid operation transaction. On the contrary, if a transaction hash value of an object operation transaction is incorrect and the operation time is not within the target time range, the object operation transaction is not a valid operation transaction, so that the first object operation transaction that is not a valid operation transaction cannot be executed.

Specifically, transaction parameters of the second object operation transaction include a transaction hash value of the second object operation transaction and operation time information of the second object operation transaction. This embodiment of this disclosure may further include: performing hash calculation on the second object operation transaction by using the transaction hash value of the second object operation transaction as a second operation transaction hash value, to obtain a second to-be-verified hash value of the second object operation transaction, and performing hash comparison on the second operation transaction hash value and the second to-be-verified hash value, to obtain a second hash comparison result; further, using the operation time information of the second object operation transaction as second operation time information, and identifying a second time association result between the second operation time information and a target time range, the second time association result being configured for indicating that the second operation time information falls within the target time range or the second operation time information does not fall within the target time range; and further, using the second object operation transaction as a second valid operation transaction when the second hash comparison result indicates that the second operation transaction hash value remains consistent with the second to-be-verified hash value, and the second time association result indicates that the second operation time information falls within the target time range.

For a process of verifying the transaction hash value and the operation time information of the second object operation transaction, references may be made to the foregoing related description of verifying the transaction hash value and the operation time information of the second object operation transaction, and details are not described herein again.

Processes of verifying the operation signature, the transaction hash value, and the operation time of the object operation transaction may be performed simultaneously, and the object operation transaction is executed only when the operation signature, the transaction hash value, and the operation time of the object operation transaction are all successfully verified.

For example, referring to FIG. 6, FIG. 6 is a schematic flowchart of an operation transaction verification process according to an embodiment of this disclosure. A consensus node may perform operation S601 shown in FIG. 6, to receive a target on-chain transaction uploaded by a service node. In this way, after receiving the target on-chain transaction, the consensus node may perform signature verification on on-chain transaction signature information in the target on-chain transaction by using public key information of a service providing object in the target on-chain transaction, and then may further perform operation S602 when the signature verification is successful. In other words, as shown in FIG. 6, the consensus node may invoke entry processing data, and parse transaction parameters of an initial on-chain transaction to obtain each object operation transaction in the initial on-chain transaction; and my verify a transaction parameter in each object operation transaction (for example, may perform signature verification, transaction hash value verification, or operation time information verification). Specifically, the consensus node may further perform operation S603 to invoke entry processing data to perform signature verification on each object operation transaction. In addition, as shown in FIG. 6, during signature verification, the consensus node may not only perform operation S604 shown in FIG. 6 together to verify whether a transaction hash value of each object operation transaction is correct, but also perform operation S605 shown in FIG. 6 together to verify whether operation time information of each object operation transaction falls within a target time range. In this way, as shown in FIG. 6, after completing verification on the transaction parameters in the object operation transactions, the consensus node may further perform operation S606, to determine whether the object operation transactions are verified. Specifically, for example, if the signature verification is successful, the transaction hash value is correct, and the operation time information falls within the target time range, the consensus node may determine that the verification succeeds, or otherwise, the consensus node may determine that the verification fails. In this embodiment of this disclosure, for a method for performing signature verification, transaction hash value verification, and operation time verification on each object operation transaction, refer to the foregoing descriptions. Details are not described herein again. An object operation transaction that is verified is a signature-verified operation transaction and a valid operation transaction, and a corresponding object operation transaction may be executed only after the object operation transaction is verified.

The consensus node verifies the operation signature information, the transaction hash value, and the operation time information of the object operation transaction, and after the verification succeeds, may parse the entry processing data to obtain processing data invoking parameter information in the object operation transaction, so that a corresponding smart contract (service processing data) can be invoked to execute the corresponding object operation transaction, thereby obtaining a transaction execution result of the corresponding object operation transaction. Object operation transactions packaged in batches into a target on-chain transaction in this application may still be verified, and the target on-chain transaction obtained through packaging behaves consistently with a conventional transaction of a blockchain in terms of performance and universality.

Specifically, the second operation object transaction is a second signature-verified operation transaction and a second valid operation transaction, and the second object operation transaction includes a transaction hash value of the second object operation transaction. This embodiment of this disclosure may further include the following: The consensus node may invoke the entry processing data to obtain processing data invoking parameter information in the second object operation transaction through parsing. The processing data invoking parameter information in the second object operation transaction herein may specifically include a processing data name and address of service processing data for the second object operation transaction. Further, the consensus node may invoke service processing data indicated by the processing data invoking parameter information in the second object operation transaction to execute the second object operation transaction, and obtain a transaction execution result of the second object operation transaction. Further, the consensus node may store transaction parameters of the second object operation transaction in association with a transaction hash value of the second object operation transaction as second operation key-value information, and store the transaction execution result of the second object operation transaction in association with the transaction hash value of the second object operation transaction as second result key-value information. In this embodiment of this disclosure, the transaction execution result of the second object operation transaction may be collectively referred to as a transaction execution result of an object operation transaction. When the object operation transaction herein is denoted as the foregoing UO, the transaction execution result of the object operation transaction may be specifically denoted as UOResult.

If the second operation object transaction is a second signature-verified operation transaction and a second valid operation transaction, it means that the operation signature, the transaction hash value, and the operation time of the second object operation transaction all pass verification. The transaction execution result of the second object operation transaction may be configured for indicating execution success information or execution error information of the second object operation transaction.

The second operation key-value information may be configured for storing a transaction parameter of the second object operation transaction, may be configured for storing the second object operation transaction (that is, the object operation transaction, where the object operation transaction may be the foregoing UO), may be configured for storing transaction information of the second object operation transaction, and the like. For example, the second operation key-value information may be a key-value pair formed by using "{transaction hash value of the second object operation transaction} _UO" as a key and the transaction parameter of the second object operation transaction as a value.

In some embodiments, the second operation key-value information may be configured for storing the transaction execution result of the second object operation transaction. For example, the second result key-value information may be a key-value pair formed by using "{transaction hash value of the second object operation transaction} _UOResult" as a key and the transaction execution result of the second object operation transaction as a value.

Figure 7:
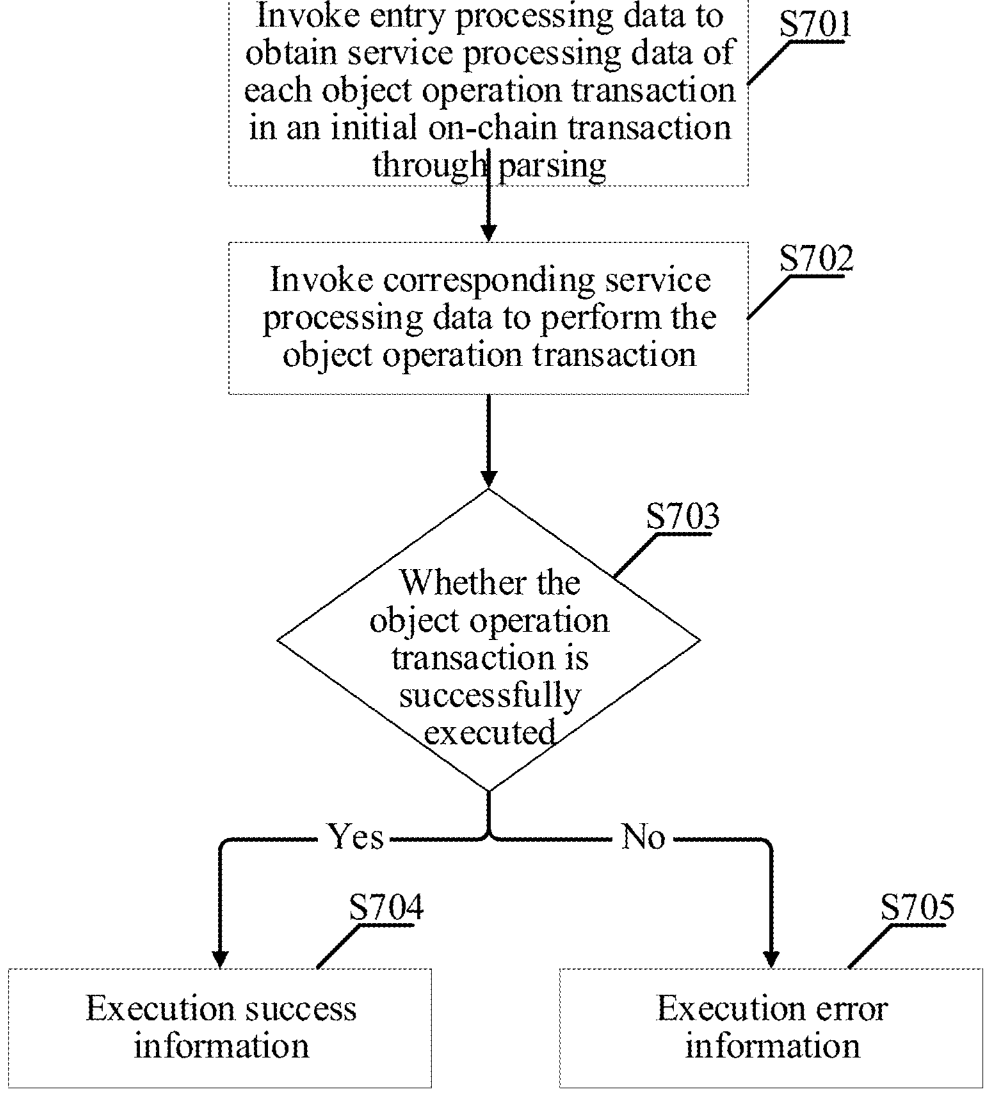
FIG. 7 is an example schematic flowchart of a transaction execution process according to an embodiment of this disclosure.

For example, referring to FIG. 7, FIG. 7 is a schematic flowchart of a transaction execution process according to an embodiment of this disclosure. As shown in FIG. 7, a consensus node may invoke entry processing data (that is, an entry contract) to obtain service processing data of each object operation transaction in an initial on-chain transaction through (operation S701), then the consensus node may invoke corresponding service processing data to execute an object operation transaction (operation S702), then determine whether the object operation transaction is successfully executed (operation S703); if the object operation transaction is successfully executed, may obtain execution success information (operation S704); and if the object operation transaction is not successfully executed, may obtain execution error information (operation S705). Both the execution success information and the execution error information may be referred to as transaction execution results of the object operation transaction.

Further, the consensus node may execute the object operation transactions in the initial on-chain transaction in sequence according to a transaction sequence of the object operation transactions corresponding to transaction parameters of the initial on-chain transaction, that is, may execute the object operation transactions in a sequence from early to late according to operation time information of the object operation transactions of the initial on-chain transaction. According to the foregoing description, when the service node adds the first object operation transaction to the local transaction pool, the second object operation transaction already exists in the local transaction pool. Therefore, the operation time information of the second object operation transaction is earlier than the operation time information of the first object operation transaction. Therefore, when the consensus node executes the object operation transactions in the initial on-chain transaction, the second object operation transaction may be first executed and then the first object operation transaction is executed, thereby avoiding confusion of execution results when there is a time sequence problem between some object operation transactions, and further ensuring reliability of execution of the object operation transactions.

Specifically, the first object operation transaction and the second object operation transaction in the initial on-chain transaction are obtained by performing transaction sorting based on first operation time information of the first object operation transaction and second operation time information of the second object operation transaction; the first operation time information is earlier than the second operation time information; and the first object operation transaction is a first signature-verified operation transaction and a first valid operation transaction, and the first object operation transaction includes a transaction hash value of the first object operation transaction. In this case, this embodiment of this disclosure may further include: invoking, when the transaction execution result of the second object operation transaction is obtained, the entry processing data (that is, the entry contract) to obtain processing data invoking parameter information in the first object operation transaction through parsing, where the processing data invoking parameter information in the first object operation transaction may specifically include the processing data name (that is, a contract name) and address of the service processing data for the second object operation transaction; further, invoking service processing data (that is, a service contract) indicated by the processing data invoking parameter information (that is, contract invoking parameter information) in the first object operation transaction to execute the first object operation transaction, and determining a transaction execution result of the first object operation transaction; and further, storing transaction parameters of the first object operation transaction in association with the transaction hash value of the first object operation transaction as first operation key-value information, and storing the transaction execution result of the first object operation transaction in association with the transaction hash value of the first object operation transaction as first result key-value information.

The first object operation transaction needs to be executed when the transaction execution result of the second object operation transaction is obtained, because the operation time information of the second object operation transaction is earlier than the operation time information of the first object operation transaction.

For the related description of the first operation key-value information, references may be made to the related description of the second operation key-value information, that is, the first operation key-value information may be configured for storing the transaction parameter of the first object operation transaction, or may be configured for storing the second object operation transaction, or the like. For example, the first operation key-value information may be a key-value pair formed by using "{transaction hash value of the first object operation transaction} _UO" as a key and the transaction parameter of the first object operation transaction as a value.

For the related description of the first result key-value information, references may be made to the related description of the second result key-value information, that is, the first operation key-value information may be configured for storing the transaction execution result of the first object operation transaction. For example, the first result key-value information may be a key-value pair formed by using "{transaction hash value of the first object operation transaction} _UOResult" as a key and the transaction execution result of the first object operation transaction as a value.

In some embodiments, when the target on-chain transaction is being on-chained, on-chain information of the target on-chain transaction may be further stored, that is, the transaction hash value of the target on-chain transaction may be stored in association with the on-chain information of the target on-chain transaction. For example, the transaction hash value of the target on-chain transaction is stored in association with the on-chain information of the target on-chain transaction as on-chain transaction key-value information. A key in the on-chain transaction key-value information includes the transaction hash value of the target on-chain transaction, a value in the on-chain transaction key-value information is the on-chain information of the target on-chain transaction, and the on-chain information may include a height value of a block height of a block in which the target on-chain transaction is located.

The first operation key-value information and the second operation key-value information may be used by a subsequent service object to query the object operation transaction based on the transaction hash value of the object operation transaction, and the first result key-value information and the second result key-value information may be used by the subsequent service object to query the transaction execution result of the object operation transaction based on the transaction hash value of the object operation transaction.

Based on the foregoing description, two map-type data structures may be stored in the entry processing data, that is, data structures corresponding to the operation key-value information and the result key-value information, so that the entry processing data can be invoked to determine the first operation key-value information, the second operation key-value information, the first result key-value information, and the second result key-value information. In some embodiments, the on-chain transaction key-value information may be used by a subsequent service object to query corresponding on-chain information based on a transaction hash value of an on-chain transaction on which an object operation transaction is located.

Specifically, the consensus node may receive an operation transaction query request submitted by a target service object for a to-be-queried object operation transaction, the operation transaction query request carrying a transaction hash value of the to-be-queried object operation transaction; invoke the entry processing data, search for operation key-value information and result key-value information that match the transaction hash value of the to-be-queried object operation transaction, determine found operation key-value information matching the transaction hash value of the to-be-queried object operation transaction as target operation key-value information, and determine found result key-value information matching the transaction hash value of the to-be-queried object operation transaction as target result key-value information; and determine a transaction parameter of the to-be-queried object operation transaction based on the target operation key-value information, and determine a transaction execution result of the to-be-queried object operation transaction based on the target result key-value information.

The target service object may be any service object, for example, the first service object or the second service object. The operation transaction query request may be configured for querying the transaction parameter and the transaction execution result of the to-be-queried object operation transaction. The entry processing data (that is, the entry contract) of the consensus node may store operation key-value information and result key-value information of a plurality of executed object operation transactions. Each piece of operation key-value information and result key-value information may include a transaction hash value of a corresponding object operation transaction. Therefore, target operation key-value information and target result key-value information corresponding to the to-be-queried object operation transaction may be found based on the transaction hash value of the to-be-queried object operation transaction, thereby finding the transaction parameter and the execution result of the to-be-queried object operation transaction. If the operation key-value information and the result key-value information that match the transaction hash value of the to-be-queried object operation transaction are not found in the consensus node, prompt information may be returned to prompt that the target service object does not find the to-be-queried object operation transaction and the transaction execution result of the to-be-queried object operation transaction on the blockchain. If the consensus node finds the transaction parameter and the transaction execution result of the to-be-queried object operation transaction, the consensus node may return the found transaction parameter and transaction execution result to a user terminal corresponding to the target service object.

The entry processing data of the blockchain may open, to the service object, a query interface configured for querying an object operation transaction and an execution result of the object operation transaction. In this case, when the service object needs to verify whether the object operation transaction of the service object is on-chained, the service object may bypass the service providing object, that is, may directly initiate a query request to the query interface of the consensus node of the blockchain by using the user terminal. Because the operation query request is read-only and not written, the consensus node may not perform identity authentication on the service object submitting the query request.

The service object may further submit a query request for independently querying the transaction parameter of the object operation transaction, may further submit a query request for independently querying the transaction execution result of the object operation transaction, may further submit a query request for independently querying on-chain information of an on-chain transaction on the object operation transaction is located, or may query all or some information at a time, which is not limited herein.

In this embodiment of this disclosure, when the service object needs to submit one object operation transaction, the service object does not need to perform address registration on the blockchain, but performs object registration on the service node corresponding to the service providing object in the blockchain. In this way, the service node in the blockchain may package object operation transactions submitted by a plurality of service objects into one target on-chain transaction, and when the service node uploads this target on-chain transaction obtained through packaging to the consensus node on the blockchain, it is equivalent to the service node uploading a plurality of object operation transactions in the target on-chain transaction in batches to the consensus node on the blockchain. In this embodiment of this disclosure, the service node may perform transaction signing on the initial on-chain transaction by using the private key information of the service providing object, to obtain on-chain transaction signature information of the service providing object (specifically, the service node may encrypt the hash value of the transaction parameter in the initial on-chain transaction by using the private key information of the service providing object, and then may use the encrypted hash value of the transaction parameter in the initial on-chain transaction as a digital signature of the initial on-chain transaction), so that the on-chain transaction signature information may be appended to the initial on-chain transaction. In this way, when the initial on-chain transaction carrying the on-chain transaction signature information is used as the target on-chain transaction, the service node may further submit the target on-chain transaction to the consensus node (for example, the foregoing consensus node) on the blockchain. In this case, the consensus node may perform signature verification on the on-chain transaction signature information in the target on-chain transaction when receiving the target on-chain transaction. Specifically, the consensus node may decrypt the on-chain transaction signature information by using the public key information of the target service object carried in the target on-chain transaction, to obtain the hash value of the transaction parameter of the initial on-chain transaction through decryption. In this case, the consensus node may further recalculate the hash value of the transaction parameter of the initial on-chain transaction based on the transaction parameter of the initial on-chain transaction carried in the target on-chain transaction, and then may determine whether the hash value of the transaction parameter of the initial on-chain transaction obtained through recalculation is consistent with the hash value of the transaction parameter of the initial on-chain transaction obtained through decryption. If they are consistent, it may be determined that the target on-chain transaction that currently needs to be on-chain is valid, and the transaction parameters of the initial on-chain transaction carried in the target on-chain transaction are not tampered with without authorization. That is, when receiving the target on-chain transaction, the consensus node may perform signature verification (that is, decrypt) on the on-chain transaction signature information in the target on-chain transaction based on the public key information of the service providing object in the target on-chain transaction, and when the signature verification is successful, determine that signature verification on each object operation transaction in the initial on-chain transaction is completed, thereby improving signature verification efficiency. In addition, when the signature verification is successful, the consensus node may invoke the entry processing data on the consensus node to perform parameter parsing on the transaction parameter of the initial on-chain transaction, to obtain the first object operation transaction and the second object operation transaction through parsing. Further, the consensus node may further obtain processing data invoking parameter information in the object operation transaction (for example, the first object operation transaction and the second object operation transaction) by parsing the entry processing data, so that a corresponding smart contract (service processing data) can be invoked to execute a corresponding object operation transaction, thereby obtaining a transaction execution result of the corresponding object operation transaction. In this embodiment of this disclosure, the object operation transactions packaged in batches into the target on-chain transaction may still be verified and executed, and the transaction execution results of the corresponding object operation transactions may also be stored in the entry processing data in a form of a key-value pair, in order to retain the entry processing data that may be subsequently processed by the service object thereby improving efficiency of information query. In addition, because the service object does not need to perform address registration on the blockchain, a quantity of registration transactions generated when the service object performs address registration on the blockchain can be reduced, thereby reducing a problem of occupying storage space of the consortium blockchain by registration transactions.

Figure 8:
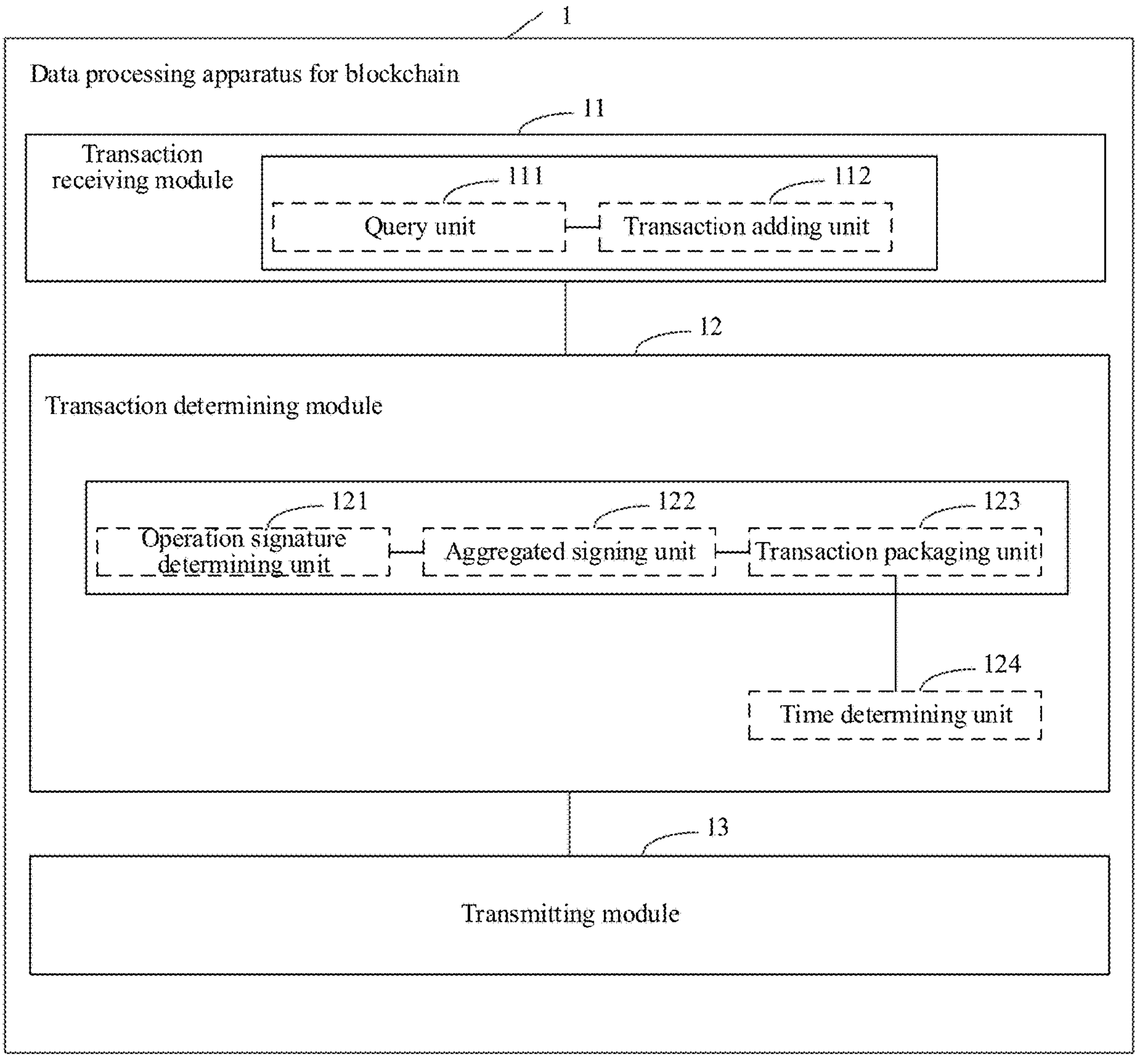
FIG. 8 is an example schematic structural diagram of a data processing apparatus for a blockchain according to an embodiment of this disclosure.

Referring to FIG. 8, FIG. 8 is a schematic structural diagram of a data processing apparatus for a blockchain according to an embodiment of this disclosure. As shown in FIG. 8, the data processing apparatus for a blockchain 1 may be a computer program (including program code) running on a service node (for example, the foregoing service node 100*a*). For example, the data processing apparatus for a blockchain 1 is application software. The data processing apparatus for a blockchain 1 may be configured to perform corresponding operations in the data processing method for a blockchain provided in the embodiments of this disclosure. As shown in FIG. 8, the data processing apparatus for a blockchain 1 may include: a transaction receiving module 11, a transaction determining module 12, and a transmitting module 13.

The transaction receiving module 11 is configured to: add, when a first object operation transaction associated with a first service object is received, the first object operation transaction to a local transaction pool of the service node, and use the local transaction pool added with the first object operation transaction as a to-be-assembled transaction pool; transactions in the to-be-assembled transaction pool including the first object operation transaction and a second object operation transaction; the first object operation transaction being operation data submitted by the first service object; the second object operation transaction being operation data submitted by a second service object; both the second service object and the first service object being off-chain registered objects; the off-chain registered object being a service object that performs object registration on the service node and is successfully registered; the object registration referring to a registration operation performed, on the service node, for an object identifier and an address submitted by the service object; and the service object including the first service object and the second service object; and the transaction determining module 12 is configured to perform, when the to-be-assembled transaction pool satisfies an operation transaction packaging condition of the service node, transaction packaging on the first object operation transaction and the second object operation transaction, to obtain an initial on-chain transaction; the transaction packaging referring to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction being a to-be-signed on-chain transaction obtained after the service node performs the packaging operation; and the to-be-signed on-chain transaction referring to a transaction when the initial on-chain transaction is to be signed by a service providing object;

the transaction determining module 12 is further configured to: perform signing processing, when private key information of a service providing object corresponding to the service node is obtained, on the initial on-chain transaction by using the private key information of the service providing object, to obtain on-chain transaction signature information of the service providing object for the initial on-chain transaction, and construct a target on-chain transaction corresponding to the initial on-chain transaction based on the on-chain transaction signature information, public key information of the service providing object, and the transaction parameters in the initial on-chain transaction; the target on-chain transaction being a signed on-chain transaction; the signed on-chain transaction referring to a transaction obtained after the initial on-chain transaction is signed by the service providing object, and transaction parameters in the target on-chain transaction including the on-chain transaction signature information, the public key information of the service providing object, and the transaction parameters in the initial on-chain transaction; the signing processing being a signing operation performed by the service node when encrypting a hash value of the initial on-chain transaction by using the private key information of the service providing object, and the on-chain transaction signature information being a digital signature obtained by the service node after performing the signing operation; and the hash value of the initial on-chain transaction being determined by the transaction parameters in the initial on-chain transaction; and the transmitting module 13 is configured to transmit, when the service providing object is an on-chain registered object obtained after address registration is performed on a blockchain, the target on-chain transaction to a consensus node associated with the blockchain, so that the consensus node performs, when obtaining the on-chain transaction signature information through parsing, signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the first object operation transaction and the second object operation transaction.

The transaction determining module 12 further includes: an operation signature determining unit 121, an aggregated signing unit 122, and a transaction packaging unit 123.

The operation signature determining unit 121 is configured to determine, based on a parameter value of a signature parameter in the first object operation transaction, first operation signature information obtained after the first service object performs transaction signing on the first object operation transaction; the first operation signature information being a digital signature obtained after a transaction hash value of the first object operation transaction is encrypted by using private key information of the first service object;

the operation signature determining unit 121 is further configured to determine, based on a parameter value of a signature parameter in the second object operation transaction, second operation signature information obtained after the second service object performs transaction signing on the second object operation transaction; the second operation signature information being a digital signature obtained after a transaction hash value of the second object operation transaction is encrypted by using private key information of the second service object;

the aggregated signing unit 122 is configured to aggregate the first operation signature information and the second operation signature information to obtain aggregated signature information, and adjust the parameter value of the signature parameter in the first object operation transaction and the parameter value of the signature parameter in the second object operation transaction to null values; and the transaction packaging unit 123 is configured to: use the aggregated signature information, the first object operation transaction when the parameter value of the signature parameter is a null value, and the second object operation transaction when the parameter value of the signature parameter is a null value as the transaction parameters in the initial on-chain transaction, and perform packaging based on the transaction parameters in the initial on-chain transaction, to obtain the initial on-chain transaction.

The transaction determining module 12 further includes: a time determining unit 124;

the time determining unit 124 is configured to determine operation time information of the first object operation transaction based on a time parameter in the first object operation transaction, and use the operation time information of the first object operation transaction as first operation time information;

the time determining unit 124 is further configured to determine operation time information of the second object operation transaction based on a time parameter in the second object operation transaction, and use the operation time information of the second object operation transaction as second operation time information; and the transaction packaging unit 123 is further configured to perform transaction sorting on the first object operation transaction and the second object operation transaction based on the first operation time information and the second operation time information, use the first object operation transaction and the second object operation transaction obtained through transaction sorting as the transaction parameters in the initial on-chain transaction, and perform transaction assembly on the transaction parameters in the initial on-chain transaction, to obtain the initial on-chain transaction through assembly.

Object registration service information stored in the service node stores an object identifier of each off-chain registered object after object registration is performed on the service node.

The transaction receiving module 11 further includes: a query unit 111 and a transaction adding unit 112.

The query unit 111 is configured to: obtain, when the first object operation transaction submitted by the first service object by using a first terminal is received, an object identifier of the first service object from a transaction parameter of the first object operation transaction, and query the object registration service information for an object identifier matching the object identifier of the first service object; and the transaction adding unit 112 is configured to add, if an object identifier matching the object identifier of the first service object is found, the first object operation transaction to the local transaction pool of the service node when the first service object is determined as the off-chain registered object.

The transaction receiving module 11 is further configured to receive the second object operation transaction associated with the second service object, add the second object operation transaction to an initial transaction pool of the service node when it is determined that the second service object is an off-chain registered object after object registration is performed on the service node, and use the initial transaction pool added with the second object operation transaction as the local transaction pool of the service node.

Figure 9:
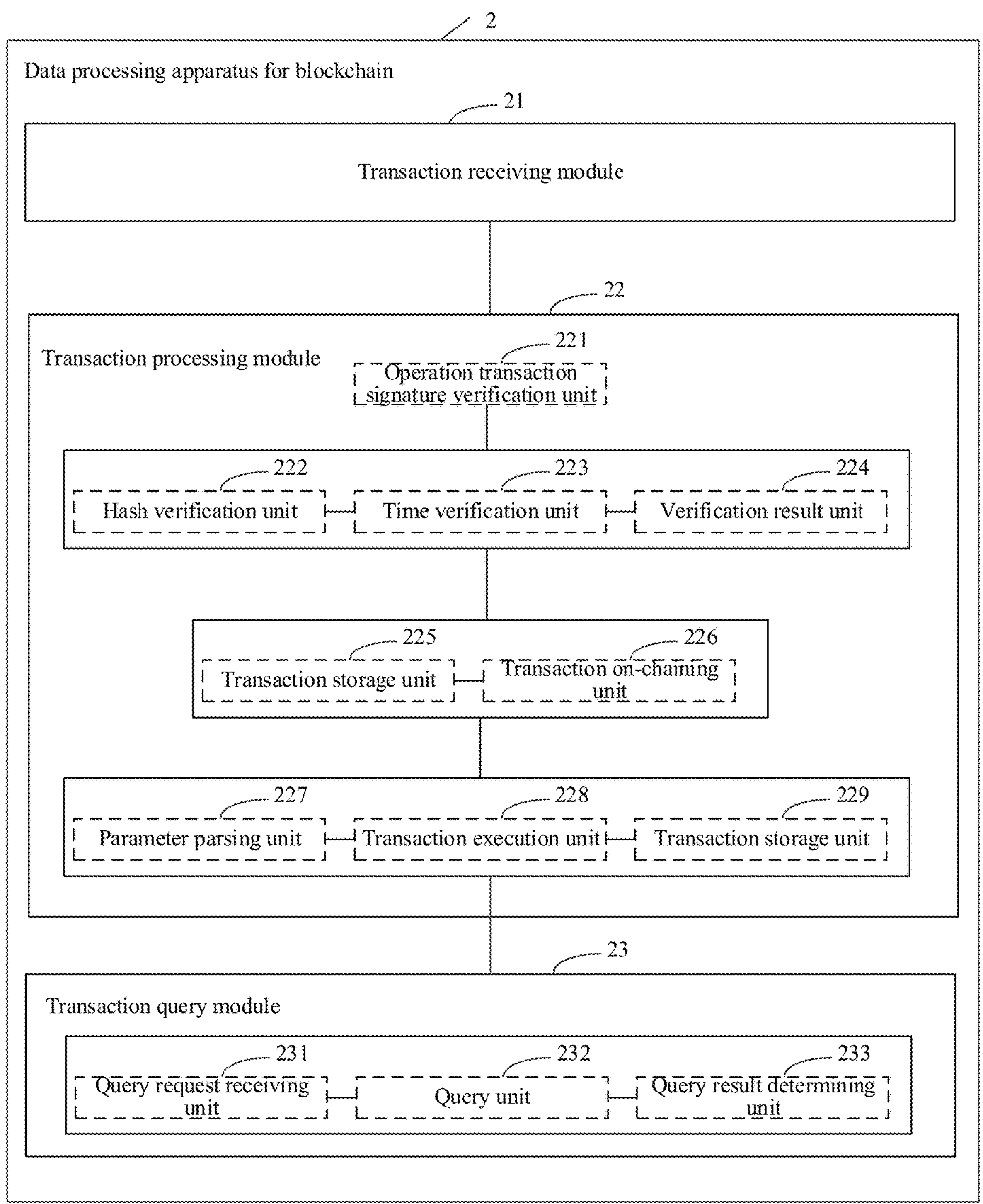
FIG. 9 is an example schematic structural diagram of a data processing apparatus for a blockchain according to an embodiment of this disclosure.

Referring to FIG. 9, FIG. 9 is a schematic structural diagram of a data processing apparatus for a blockchain according to an embodiment of this disclosure. As shown in FIG. 9, the data processing apparatus for a blockchain 2 may be a computer program (including program code) running on a consensus node (for example, the foregoing consensus node 11*a*) associated with a blockchain. For example, the data processing apparatus for a blockchain 2 is application software. The data processing apparatus for a blockchain 2 may be configured to perform corresponding operations in the data processing method for a blockchain provided in the embodiments of this disclosure. As shown in FIG. 9, the data processing apparatus for a blockchain 1 may include: a transaction receiving module 21 and a transaction processing module 22.

The transaction receiving module 21 is configured to receive a target on-chain transaction transmitted by a service node; a service providing object corresponding to the service node being an on-chain registered object obtained after address registration is performed on the blockchain; the address registration referring to a registration operation performed, on the consensus node, for an address submitted by the service providing object; the target on-chain transaction being a signed on-chain transaction; the signed on-chain transaction being a transaction obtained after an initial on-chain transaction is signed by the service providing object; transaction parameters in the target on-chain transaction including on-chain transaction signature information, public key information of the service providing object, and transaction parameters in the initial on-chain transaction, the on-chain transaction signature information being obtained by the service node by performing signing processing on the initial on-chain transaction by using private key information of the service providing object, and the initial on-chain transaction being obtained by the service node after performing transaction packaging on a first object operation transaction and a second object operation transaction; the transaction packaging referring to a packaging operation performed by the service node after performing transaction sorting on the first object operation transaction and the second object operation transaction and when using the sorted first object operation transaction and second object operation transaction as the transaction parameters of the initial on-chain transaction; the initial on-chain transaction being a to-be-signed on-chain transaction obtained after the service node performs the packaging operation; and the to-be-signed on-chain transaction referring to a transaction when the initial on-chain transaction is to be signed by a service providing object; the first object operation transaction being operation data submitted by a first service object, the second object operation transaction being operation data submitted by a second service object, and both the second service object and the first service object being off-chain registered objects; the off-chain registered object being a service object that performs object registration on the service node and is successfully registered; the object registration referring to a registration operation performed, on the service node, for an object identifier and an address submitted by the service object; and the service object including the first service object and the second service object; and the transaction processing module 22 is configured to perform parameter parsing on the transaction parameters in the target on-chain transaction, and when the on-chain transaction signature information is obtained through parsing, perform signature verification on the on-chain transaction signature information by using the public key information of the service providing object, and when the signature verification is successful, invoke entry processing data deployed on the blockchain to perform parameter parsing on the transaction parameters in the initial on-chain transaction, to obtain the first object operation transaction corresponding to the first service object and the second object operation transaction corresponding to the second service object.

The transaction parameters of the initial on-chain transaction include the first object operation transaction, the second object operation transaction, and the aggregated signature information, and both a parameter value of a signature parameter in the first object operation transaction and a parameter value of a signature parameter in the second object operation transaction are null values. The aggregated signature information is obtained by aggregating first operation signature information of the first object operation transaction and second operation signature information of the second object operation transaction. The first operation signature information is obtained by the first service object after performing transaction signing on the first object operation transaction by using private key information of the first service object. The second operation signature information is obtained by the second service object after performing transaction signing on the second object operation transaction by using private key information of the second service object.

The transaction processing module 22 further includes: an operation transaction signature verification unit 221.

The operation transaction signature verification unit 221 is configured to determine public key information of the first service object from the first object operation transaction, and determine public key information of the second service object from the second object operation transaction.

The operation transaction signature verification unit 221 is further configured to perform signature verification on the aggregated signature information based on the public key information of the first service object and the public key information of the second service object, and when the signature verification is successful, use the first object operation transaction as a first signature-verified operation transaction, and use the second object operation transaction as a second signature-verified operation transaction.

A parameter value of a signature parameter in the first object operation transaction is first operation signature information, and a parameter value of a signature parameter in the second object operation transaction is second operation signature information. The first operation signature information is obtained by the first service object after performing transaction signing on the first object operation transaction by using private key information of the first service object. The second operation signature information is obtained by the second service object after performing transaction signing on the second object operation transaction by using private key information of the second service object.

The operation transaction signature verification unit 221 is further configured to determine public key information of the first service object from the first object operation transaction, perform signature verification on the first operation signature information by using the public key information of the first service object, and use the first object operation transaction as a first signature-verified operation transaction when the signature verification is successful; and the operation transaction signature verification unit 221 is further configured to determine public key information of the second service object from the second object operation transaction, perform signature verification on the second operation signature information by using the public key information of the second service object in the second object operation transaction, and use the second object operation transaction as a second signature-verified operation transaction when the signature verification is successful.

Transaction parameters of the first object operation transaction include a transaction hash value of the first object operation transaction and operation time information of the first object operation transaction.

The transaction processing module 22 further includes: a hash verification unit 222, a time verification unit 223, and a verification result unit 224.

The hash verification unit 222 is configured to perform hash calculation on the first object operation transaction by using the transaction hash value of the first object operation transaction as a first operation transaction hash value, to obtain a first to-be-verified hash value of the first object operation transaction, and perform hash comparison on the first operation transaction hash value and the first to-be-verified hash value, to obtain a first hash comparison result;

the time verification unit 223 is configured to use the operation time information of the first object operation transaction as first operation time information, and identify a first time association result between the first operation time information and a target time range, the first time association result be configured for indicating that the first operation time information falls within the target time range or the first operation time information does not fall within the target time range; and the verification result unit 224 is configured to use the first object operation transaction as a first valid operation transaction when the first hash comparison result indicates that the first operation transaction hash value remains consistent with the first to-be-verified hash value, and the first time association result indicates that the first operation time information falls within the target time range.

Transaction parameters of the second object operation transaction include a transaction hash value of the second object operation transaction and operation time information of the second object operation transaction.

The hash verification unit 222 is further configured to perform hash calculation on the second object operation transaction by using the transaction hash value of the second object operation transaction as a second operation transaction hash value, to obtain a second to-be-verified hash value of the second object operation transaction, and perform hash comparison on the second operation transaction hash value and the second to-be-verified hash value, to obtain a second hash comparison result;

the time verification unit 223 is further configured to use the operation time information of the second object operation transaction as second operation time information, and identify a second time association result between the second operation time information and a target time range, the second time association result being configured for indicating that the second operation time information falls within the target time range or the second operation time information does not fall within the target time range; and the verification result unit 224 is further configured to use the second object operation transaction as a second valid operation transaction when the second hash comparison result indicates that the second operation transaction hash value remains consistent with the second to-be-verified hash value, and the second time association result indicates that the second operation time information falls within the target time range.

The transaction processing module 22 further includes: a transaction storage unit 225 and a transaction on-chaining unit 226.

The transaction storage unit 225 is configured to determine, when the signature verification is successful, that the target on-chain transaction is valid, and store the valid target on-chain transaction into a blockchain transaction pool corresponding to the consensus node; and the transaction on-chaining unit 226 is configured to package, when the blockchain transaction pool satisfies an on-chain transaction packaging condition of the blockchain, the target on-chain transaction into a target block, performing block consensus on the target block, and write the target block into the blockchain when block consensus is reached.

The second operation object transaction is a second signature-verified operation transaction and a second valid operation transaction, and the second object operation transaction includes a transaction hash value of the second object operation transaction.

The transaction processing module 22 further includes: a parameter parsing unit 227, a transaction execution unit 228, and a transaction storage unit 229.

The parameter parsing unit 227 is configured to invoke the entry processing data to obtain processing data invoking parameter information in the second object operation transaction through parsing; the processing data invoking parameter information in the second object operation transaction including a processing data name and address of service processing data for the second object operation transaction;

the transaction execution unit 228 is configured to invoke service processing data indicated by the processing data invoking parameter information in the second object operation transaction to execute the second object operation transaction, and obtain a transaction execution result of the second object operation transaction; and the transaction storage unit 229 is configured to store transaction parameters of the second object operation transaction in association with a transaction hash value of the second object operation transaction as second operation key-value information, and store the transaction execution result of the second object operation transaction in association with the transaction hash value of the second object operation transaction as second result key-value information.

The first object operation transaction and the second object operation transaction in the initial on-chain transaction are obtained by performing transaction sorting based on first operation time information of the first object operation transaction and second operation time information of the second object operation transaction; the first operation time information is earlier than the second operation time information; and the first object operation transaction is a first signature-verified operation transaction and a first valid operation transaction, and the first object operation transaction includes a transaction hash value of the first object operation transaction.

The parameter parsing unit 227 is further configured to invoke, when the transaction execution result of the second object operation transaction is obtained, the entry processing data to obtain processing data invoking parameter information in the first object operation transaction through parsing, the processing data invoking parameter information in the first object operation transaction including the processing data name and address of the service processing data for the second object operation transaction;

the transaction execution unit 228 is further configured to invoke service processing data indicated by the processing data invoking parameter information in the first object operation transaction to execute the first object operation transaction, and determine a transaction execution result of the first object operation transaction; and the transaction storage unit 229 is further configured to store transaction parameters of the first object operation transaction in association with the transaction hash value of the first object operation transaction as first operation key-value information, and store the transaction execution result of the first object operation transaction in association with the transaction hash value of the first object operation transaction as first result key-value information.

The entry processing data is configured for storing operation key-value information and result key-value information of an executed object operation transaction; and both operation key-value information of an object operation transaction and result key-value information of an object operation transaction include a transaction hash value of the object operation transaction. The data processing apparatus for a blockchain 2 further includes: a transaction query module 23. The transaction query module 23 includes: a query request receiving unit 231, a query unit 232, and a query result determining unit 233.

The query request receiving unit 231 is configured to receive an operation transaction query request submitted by a target service object for a to-be-queried object operation transaction, the operation transaction query request carrying a transaction hash value of the to-be-queried object operation transaction; the target service object including any one of the first service object and the second service object;

the query unit 232 is configured to: invoke the entry processing data, search for operation key-value information and result key-value information that match the transaction hash value of the to-be-queried object operation transaction, determine found operation key-value information matching the transaction hash value of the to-be-queried object operation transaction as target operation key-value information, and determine found result key-value information matching the transaction hash value of the to-be-queried object operation transaction as target result key-value information; and the query result determining unit 233 is configured to determine a transaction parameter of the to-be-queried object operation transaction based on the target operation key-value information, and determine a transaction execution result of the to-be-queried object operation transaction based on the target result key-value information.

Figure 10:
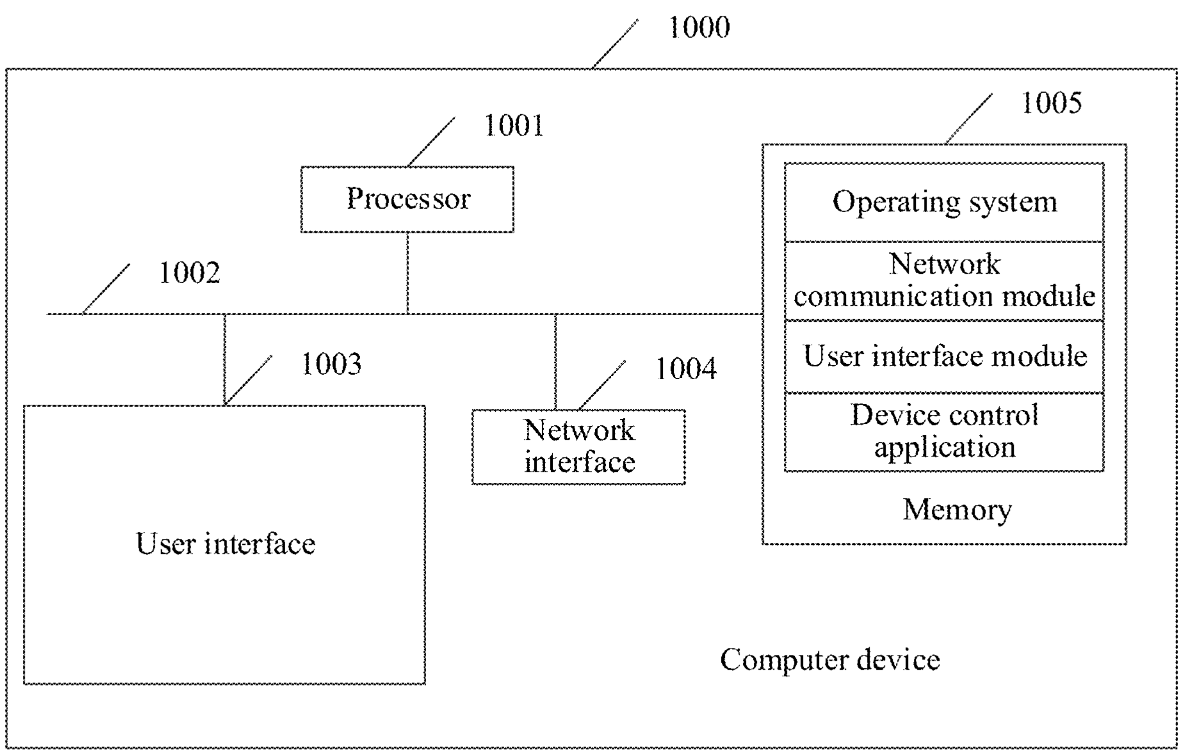
FIG. 10 is an example schematic structural diagram of a computer device according to an embodiment of this disclosure.

Referring to FIG. 10, FIG. 10 is a schematic structural diagram of a computer device according to an embodiment of this disclosure. As shown in FIG. 10, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between these components. The user interface 1003 may include a display and a keyboard. In one embodiment, the user interface 1003 may further include a standard wired interface and wireless interface. The network interface 1004 may include a standard wired interface and wireless interface (for example, a Wi-Fi interface). In some embodiments, the memory 1005 may be a high-speed RAM memory, or may be a non-volatile memory, for example, at least one magnetic disk memory. In some embodiments, the memory 1005 may be at least one storage apparatus that is located far away from the foregoing processor 1001. As shown in FIG. 10, the memory 1005 used as a computer readable storage medium may include an operating system, a network communication module, a user interface module, and a device-control application program.

In the computer device 1000 shown in FIG. 10, the network interface 1004 may provide a network communication function. The user interface 1003 is mainly configured to provide an input interface for a user. The processor 1001 may be configured to invoke a device-control application program stored in the memory 1005, so as to execute the description of the data processing method in any one of the foregoing corresponding embodiments. Details are not described herein again. In addition, the description of beneficial effects of the same method are not described herein again.

In addition, an embodiment of this disclosure further provides a computer readable storage medium. The computer readable storage medium stores a computer program executed by the foregoing data processing apparatus for a blockchain 1 and data processing apparatus for a blockchain 2, and the computer program includes program instructions. When the processor executes the program instructions, the description of the data processing method in the foregoing embodiment can be executed. Therefore, details are not described herein again. In addition, the description of beneficial effects of the same method are not described herein again. For technical details that are not disclosed in the computer readable storage medium embodiments of this disclosure, refer to the descriptions of the method embodiments of this disclosure.

The foregoing computer readable storage medium may be the data processing apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. Further, the computer readable storage medium may further include an internal storage unit of the computer device and an external storage device. The computer readable storage medium is configured to store the computer program and other programs and data required by the computer device. The computer readable storage medium may be further configured to temporarily store data that has been or is to be output.

In addition, an embodiment of this disclosure provides a computer program product or a computer program. The computer program product or the computer program includes computer instructions, and the computer instructions are stored in a computer readable storage medium. A processor of a computer device reads the computer instructions from the computer readable storage medium, and the processor executes the computer instructions, so that the computer device executes the method provided in any one of the foregoing corresponding embodiments. In addition, the description of beneficial effects of the same method are not described herein again. For technical details related to the computer program product or the computer program embodiment in this disclosure, refer to the description in the method embodiment of this disclosure.

The terms "first" and "second" in the specification, claims, and accompanying drawings of the embodiments of this disclosure are configured for distinguishing between different objects, and are not configured for describing a specific sequence. In addition, the term "include" and any variant thereof are intended to cover a non-exclusive inclusion. For example, a process, method, apparatus, product, or device that includes a series of operations or units is not limited to the listed operations or modules; and instead, in some embodiments, further includes an operation or module that is not listed, or in some embodiments, further includes another operation or unit that is intrinsic to the process, method, apparatus, product, or device.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are executed in a mode of hardware or software depends on particular applications and design constraint conditions of the technical solutions. Those skilled in the art may use different methods to implement the described functions for each particular application, but such implementation is not to be considered beyond the scope of this disclosure.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. A data processing method for a blockchain, performed by a service node and comprising:

adding, when an initial object operation transaction associated with an initial service object is received, the initial object operation transaction to a local transaction pool of the service node, and using the local transaction pool;

adding, when at least one additional object operation transaction associated with at least one additional service object is received, the at least one additional object operation transaction to the local transaction pool of the service node, wherein the at least one additional service object and the initial service object are off-chain registered objects in the service node and each service node is associated with an object identifier and an address submitted by each service object;

performing, when the local transaction pool satisfies a packaging condition of the service node, packaging of the initial object operation transaction and the at least one additional object operation transaction, to obtain an initial on-chain transaction, wherein performing packaging of the initial object operation transaction and the at least one additional object operation transaction, to obtain the initial on-chain transaction comprises: determining, based on a parameter value of a signature parameter in the initial object operation transaction, initial operation signature information; determining, based on a parameter value of a signature parameter in the at least one additional object operation transaction, at least one additional operation signature information; aggregating the initial operation signature information and the at least one additional operation signature information to obtain aggregated signature information, and adjusting the parameter value of the signature parameter in the initial object operation transaction and the parameter value of the signature parameter in the at least one additional object operation transaction to null values; and using the aggregated signature information, the initial object operation transaction when the parameter value of the signature parameter is a null value, and the at least one additional object operation transaction when the parameter value of the signature parameter is a null value, as transaction parameters in the initial on-chain transaction, and performing packaging based on the transaction parameters in the initial on-chain transaction, to obtain the initial on-chain transaction;

performing signing processing, when private key information of a service providing object corresponding to the service node is obtained, on the initial on-chain transaction with the private key information of the service providing object, to obtain on-chain transaction signature information of the service providing object for the initial on-chain transaction, and constructing a target on-chain transaction corresponding to the initial on-chain transaction based on the on-chain transaction signature information, public key information of the service providing object, and the transaction parameters in the initial on-chain transaction; and transmitting, when the service providing object is an on-chain registered object obtained after address registration is performed on a blockchain, the target on-chain transaction to a consensus node associated with the blockchain.

2. The method according to claim 1, wherein performing transaction packaging on the initial object operation transaction and the at least one additional object operation transaction, to obtain the initial on-chain transaction further comprises:

determining operation time information of the initial object operation transaction;

determining operation time information of the at least one additional object operation transaction; and performing transaction sorting on the initial object operation transaction and the at least one additional object operation transaction based on the operation time information associated with the initial object operation transaction and the at least one additional object operation transaction, and performing transaction assembly on the transaction parameters in the initial on-chain transaction, to obtain the initial on-chain transaction.

3. The method according to claim 1, wherein object registration service information stored in the service node stores an object identifier of each off-chain registered object after object registration is performed on the service node; and the method further comprises:

adding, when the initial object operation transaction associated with the initial service object is received, the initial object operation transaction to a local transaction pool of the service node comprises:

obtaining, when the initial object operation transaction submitted by the initial service object by using an initial terminal is received, an object identifier of the initial service object from a transaction parameter of the initial object operation transaction, and querying the object registration service information for an object identifier matching the initial service object; and adding, if an object identifier matching the initial service object is found, the initial object operation transaction to the local transaction pool of the service node when the initial service object is determined as the off-chain registered object.

4. The method according to claim 3, wherein the method further comprises:

receiving the at least one additional object operation transaction associated with the at least one additional service object, adding the at least one additional object operation transaction to the local transaction pool of the service node when it is determined that the at least one additional service object is an off-chain registered object after object registration is performed on the service node.

5. The method according to claim 1, wherein the service node is the consensus node.

6. The method according to claim 5, further comprising:

performing parameter parsing on transaction parameters in the target on-chain transaction, and when the on-chain transaction signature information is obtained, performing signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the initial object operation transaction and the at least one additional object operation transaction.

7. A computer device, comprising:

a memory for storing a computer program and at least one processor configured to execute the computer program to:

add, when an initial object operation transaction associated with an initial service object is received, the initial object operation transaction to a local transaction pool of a service node, and using the local transaction pool added with the initial object operation transaction as a to-be-assembled transaction pool; adding, when at least one additional object operation transaction associated with at least one additional service object is received, the at least one additional object operation transaction to a local pool of the service node; the at least one additional service object and the initial service object are off-chain registered objects in the service node, wherein each service node is associated with an object identifier and an address submitted by each service object;

perform, when the to-be-assembled transaction pool satisfies an operation transaction packaging condition of the service node, transaction packaging on the initial object operation transaction and the at least one additional object operation transaction, to obtain an initial on-chain transaction, wherein performing transaction packaging on the initial object operation transaction and the at least one additional object operation transaction, to obtain the initial on-chain transaction comprises: determine, based on a parameter value of a signature parameter in the initial object operation transaction, initial operation signature information obtained after an initial service object performs transaction signing on the initial object operation transaction; determine, based on a parameter value of a signature parameter in the at least one additional object operation transaction, at least one additional operation signature information obtained after at least one additional service object performs transaction signing on the at least one additional object operation transaction; aggregate the initial operation signature information and the at least one additional operation signature information to obtain aggregated signature information, and adjusting the parameter value of the signature parameter in the initial object operation transaction and the parameter value of the signature parameter in the at least one additional object operation transaction to null values; and use the aggregated signature information, the initial object operation transaction when the parameter value of the signature parameter is a null value, and the at least one additional object operation transaction when the parameter value of the signature parameter is a null value as transaction parameters in the initial on-chain transaction, and performing packaging based on the transaction parameters in the initial on-chain transaction, to obtain the initial on-chain transaction;

perform signing processing, when private key information of a service providing object corresponding to the service node is obtained, on the initial on-chain transaction by using the private key information of the service providing object, to obtain on-chain transaction signature information of the service providing object for the initial on-chain transaction, and constructing a target on-chain transaction corresponding to the initial on-chain transaction based on the on-chain transaction signature information, public key information of the service providing object, and the transaction parameters in the initial on-chain transaction; and transmit, when the service providing object is an on-chain registered object obtained after address registration is performed on a blockchain, the target on-chain transaction to a consensus node associated with the blockchain, so that the consensus node performs, when obtaining the on-chain transaction signature information through parsing, signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the initial object operation transaction and the at least one additional object operation transaction.

8. The computer device according to claim 7, wherein the at least one processor is further configured to execute the computer program to:

determine operation time information of the initial object operation transaction based on a time parameter in the initial object operation transaction, and using the operation time information of the initial object operation transaction as initial operation time information;

determine operation time information of the at least one additional object operation transaction based on a time parameter in the at least one additional object operation transaction, and using the operation time information of the at least one additional object operation transaction as operation time information associated with the at least one additional object operation transaction; and perform transaction sorting on the initial object operation transaction and the at least one additional object operation transaction based on the initial operation time information and the operation time information associated with the at least one additional object operation transaction, using the initial object operation transaction and the at least one additional object operation transaction obtained through transaction sorting as transaction parameters in the initial on-chain transaction, and performing transaction assembly on the transaction parameters in the initial on-chain transaction, to obtain the initial on-chain transaction.

9. The computer device according to claim 7, wherein object registration service information stored in the service node stores an object identifier of each off-chain registered object after object registration is performed on the service node; and the at least one processor is further configured to execute the computer program to:

add, when the initial object operation transaction associated with the initial service object is received, the initial object operation transaction to a local transaction pool of the service node comprises:

obtain, when the initial object operation transaction submitted by the initial service object by using an initial terminal is received, an object identifier of the initial service object from a transaction parameter of the initial object operation transaction, and querying the object registration service information for an object identifier matching the initial service object; and add, if an object identifier matching the initial service object is found, the initial object operation transaction to the local transaction pool of the service node when the initial service object is determined as the off-chain registered object.

10. The computer device according to claim 7, wherein the at least one processor is further configured to execute the computer program to:

receive the at least one additional object operation transaction associated with the at least one additional service object, adding the at least one additional object operation transaction to the local transaction pool of the service node when it is determined that the at least one additional service object is an off-chain registered object after object registration is performed on the service node.

11. The computer device according to claim 7, wherein the service node is the consensus node.

12. The computer device according to claim 11, wherein the at least one processor is further configured to execute the computer program to: perform parameter parsing on transaction parameters in the target on-chain transaction, and when the on-chain transaction signature information is obtained, performing signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the initial object operation transaction and the at least one additional object operation transaction.

13. A non-transitory computer readable storage medium for storing instructions, the instructions, when executed by at least one processor, are configured to cause the at least one processor to:

add, when an initial object operation transaction associated with an initial service object is received, the initial object operation transaction to a local transaction pool of a service node, and using the local transaction pool added with the initial object operation transaction as a to-be-assembled transaction pool; adding, when at least one additional object operation transaction associated with at least one additional service object is received, the at least one additional object operation transaction to a local pool of the service node; the at least one additional service object and the initial service object are off-chain registered objects in the service node, wherein each service node is associated with an object identifier and an address submitted by each service object;

perform, when the to-be-assembled transaction pool satisfies an operation transaction packaging condition of the service node, transaction packaging on the initial object operation transaction and the at least one additional object operation transaction, to obtain an initial on-chain transaction, wherein performing transaction packaging on the initial object operation transaction and the at least one additional object operation transaction, to obtain the initial on-chain transaction comprises: determine, based on a parameter value of a signature parameter in the initial object operation transaction, initial operation signature information obtained after an initial service object performs transaction signing on the initial object operation transaction; determine, based on a parameter value of a signature parameter in the at least one additional object operation transaction, at least one additional operation signature information obtained after at least one additional service object performs transaction signing on the at least one additional object operation transaction; aggregate the initial operation signature information and the at least one additional operation signature information to obtain aggregated signature information, and adjusting the parameter value of the signature parameter in the initial object operation transaction and the parameter value of the signature parameter in the at least one additional object operation transaction to null values; and use the aggregated signature information, the initial object operation transaction when the parameter value of the signature parameter is a null value, and the at least one additional object operation transaction when the parameter value of the signature parameter is a null value as transaction parameters in the initial on-chain transaction, and performing packaging based on the transaction parameters in the initial on-chain transaction, to obtain the initial on-chain transaction;

perform signing processing, when private key information of a service providing object corresponding to the service node is obtained, on the initial on-chain transaction by using the private key information of the service providing object, to obtain on-chain transaction signature information of the service providing object for the initial on-chain transaction, and constructing a target on-chain transaction corresponding to the initial on-chain transaction based on the on-chain transaction signature information, public key information of the service providing object, and the transaction parameters in the initial on-chain transaction; and transmit, when the service providing object is an on-chain registered object obtained after address registration is performed on a blockchain, the target on-chain transaction to a consensus node associated with the blockchain, so that the consensus node performs, when obtaining the on-chain transaction signature information through parsing, signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the initial object operation transaction and the at least one additional object operation transaction.

14. The non-transitory computer readable storage medium of claim 13, wherein the instructions, when executed by the at least one processor, are further configured to cause the at least one processor to:

determine operation time information of the initial object operation transaction based on a time parameter in the initial object operation transaction, and using the operation time information of the initial object operation transaction as initial operation time information;

determine operation time information of the at least one additional object operation transaction based on a time parameter in the at least one additional object operation transaction, and using the operation time information of the at least one additional object operation transaction as operation time information associated with the at least one additional object operation transaction; and perform transaction sorting on the initial object operation transaction and the at least one additional object operation transaction based on the initial operation time information and the operation time information associated with the at least one additional object operation transaction, using the initial object operation transaction and the at least one additional object operation transaction obtained through transaction sorting as transaction parameters in the initial on-chain transaction, and performing transaction assembly on the transaction parameters in the initial on-chain transaction, to obtain the initial on-chain transaction.

15. The non-transitory computer readable storage medium of claim 13, wherein object registration service information stored in the service node stores an object identifier of each off-chain registered object after object registration is performed on the service node; and the instructions, when executed by the at least one processor, are further configured to cause the at least one processor to:

add, when the initial object operation transaction associated with the initial service object is received, the initial object operation transaction to a local transaction pool of the service node comprises:

obtain, when the initial object operation transaction submitted by the initial service object by using an initial terminal is received, an object identifier of the initial service object from a transaction parameter of the initial object operation transaction, and querying the object registration service information for an object identifier matching the initial service object; and add, if an object identifier matching the initial service object is found, the initial object operation transaction to the local transaction pool of the service node when the initial service object is determined as the off-chain registered object.

16. The non-transitory computer readable storage medium of claim 13, wherein the instructions, when executed by the at least one processor, are further configured to cause the at least one processor to:

receive the at least one additional object operation transaction associated with the at least one additional service object, adding the at least one additional object operation transaction to the local transaction pool of the service node when it is determined that the at least one additional service object is an off-chain registered object after object registration is performed on the service node.

17. The non-transitory computer readable storage medium of claim 13, wherein the service node is the consensus node.

18. The non-transitory computer readable storage medium of claim 17, wherein the instructions, when executed by the at least one processor, are further configured to cause the at least one processor to:

perform parameter parsing on transaction parameters in the target on-chain transaction, and when the on-chain transaction signature information is obtained, performing signature verification on the on-chain transaction signature information by using the public key information of the service providing object, and when the signature verification is successful, invoking entry processing data deployed on the blockchain to perform parameter parsing on the transaction parameters in the initial on-chain transaction, to obtain the initial object operation transaction and the at least one additional object operation transaction.

* * * * *